(12) United States Patent
Kotikalapoodi

(10) Patent No.: US 10,084,384 B1
(45) Date of Patent: Sep. 25, 2018

(54) METHOD AND APPARATUS FOR SWITCHED CAPACITOR AND INDUCTOR BASED-SWITCH MODE POWER SUPPLY

(71) Applicant: Sridhar Kotikalapoodi, Sunnyvale, CA (US)

(72) Inventor: Sridhar Kotikalapoodi, Sunnyvale, CA (US)

( * ) Notice: Subject to any disclaimer, the term of this patent is extended or adjusted under 35 U.S.C. 154(b) by 11 days.

(21) Appl. No.: 14/693,746

(22) Filed: Apr. 22, 2015

(51) Int. Cl.
*H02M 3/158* (2006.01)
*H02M 1/00* (2006.01)

(52) U.S. Cl.
CPC .... *H02M 3/1588* (2013.01); *H02M 2001/007* (2013.01)

(58) Field of Classification Search
CPC .............. H02M 2001/007; H02M 3/1588
See application file for complete search history.

(56) References Cited

U.S. PATENT DOCUMENTS

| | | | | |
|---|---|---|---|---|
| 8,854,019 B1* | 10/2014 | Levesque | ................ | H02M 3/07 323/266 |
| 2008/0158915 A1* | 7/2008 | Williams | ................ | H02M 3/07 363/21.06 |
| 2009/0278520 A1* | 11/2009 | Perreault | ................ | H02M 3/07 323/282 |
| 2016/0352219 A1* | 12/2016 | Amgad Abdulslam | ...................... | H02M 1/08 |

* cited by examiner

*Primary Examiner* — Kyle J Moody
*Assistant Examiner* — Peter Novak
(74) *Attorney, Agent, or Firm* — Heimlich Law, PC; Alan Heimlich, Esq.

(57) ABSTRACT

Method and Apparatus for a switch mode power supply are disclosed. The switch mode power supply is efficient and generates a very small inductor current ripple and output voltage ripple. The switch mode power supply has a wider bandwidth and the filter components including magnetic storage element and the output capacitor can be made extremely smaller.

11 Claims, 20 Drawing Sheets

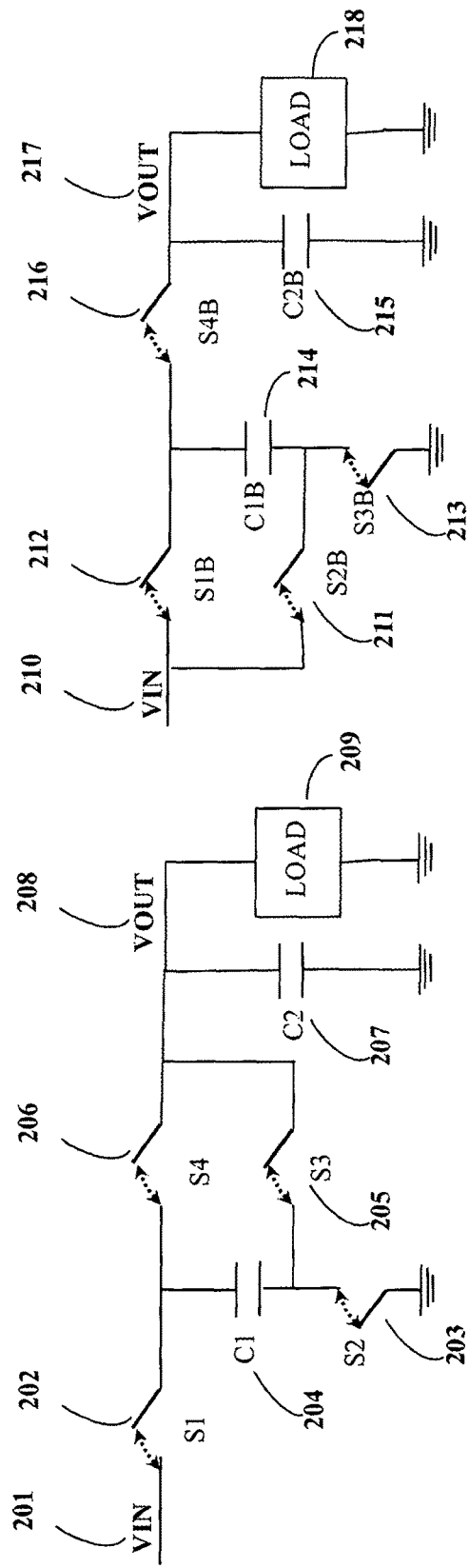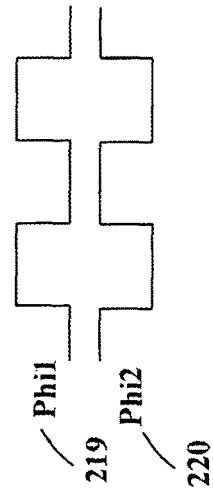
FIG. 2A Prior Art
FIG. 2B Prior Art
FIG. 2C Prior Art

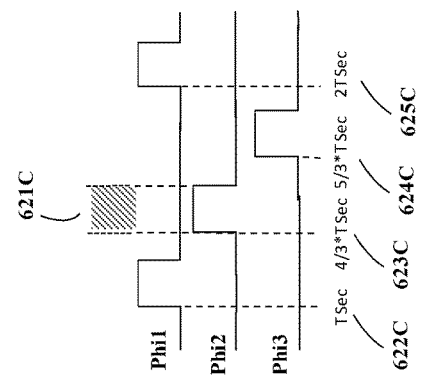
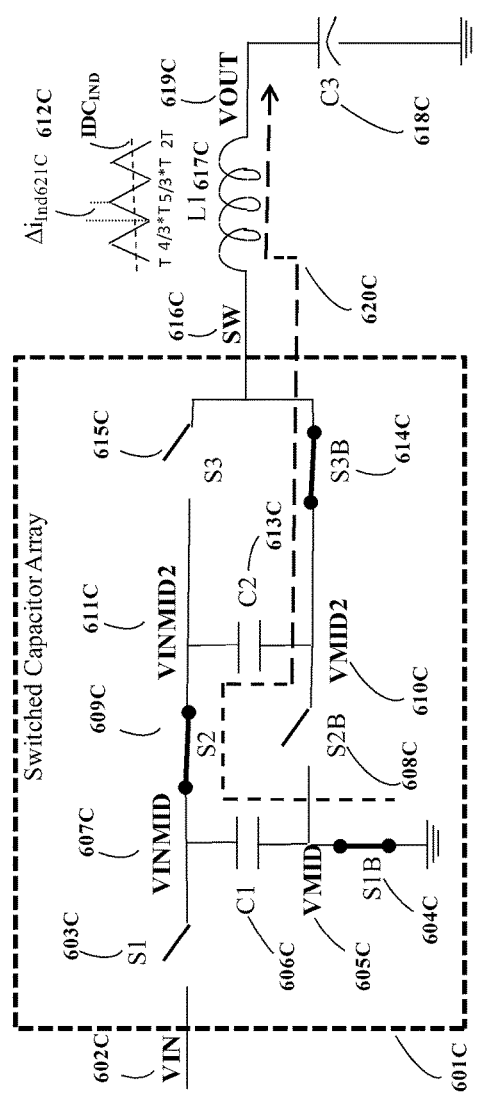
FIG. 6C
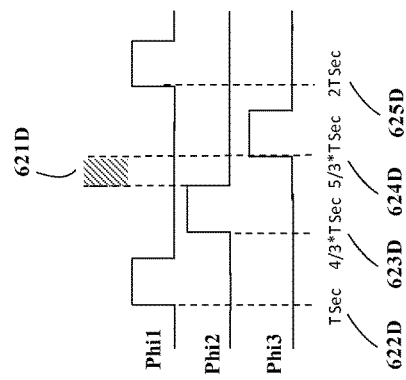
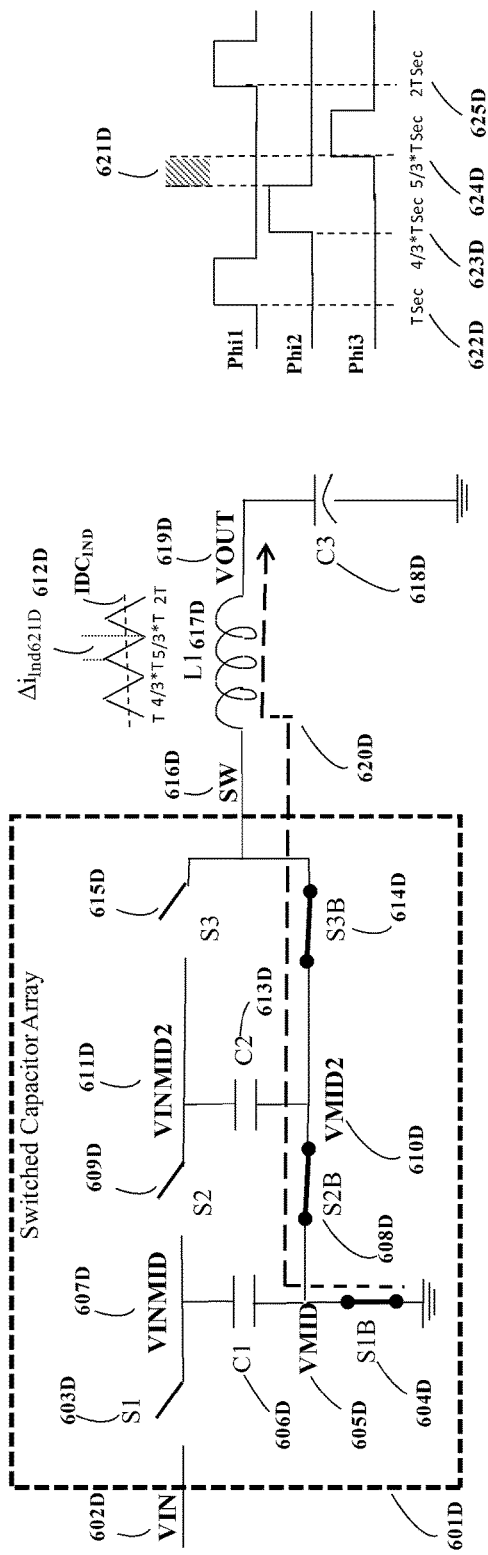
FIG. 6D

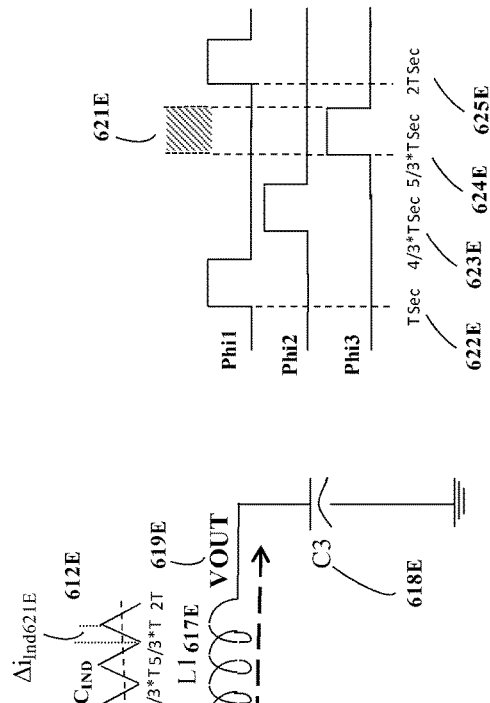
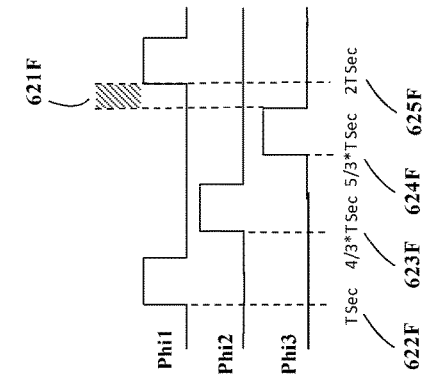
FIG. 6E
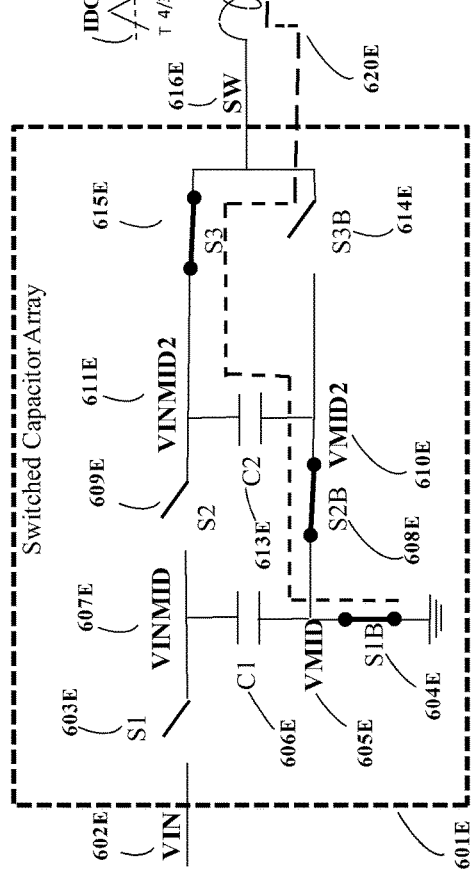
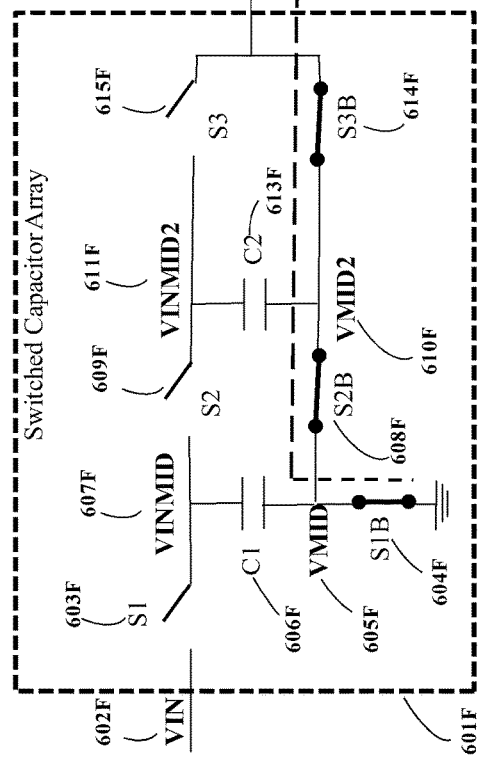
FIG. 6F

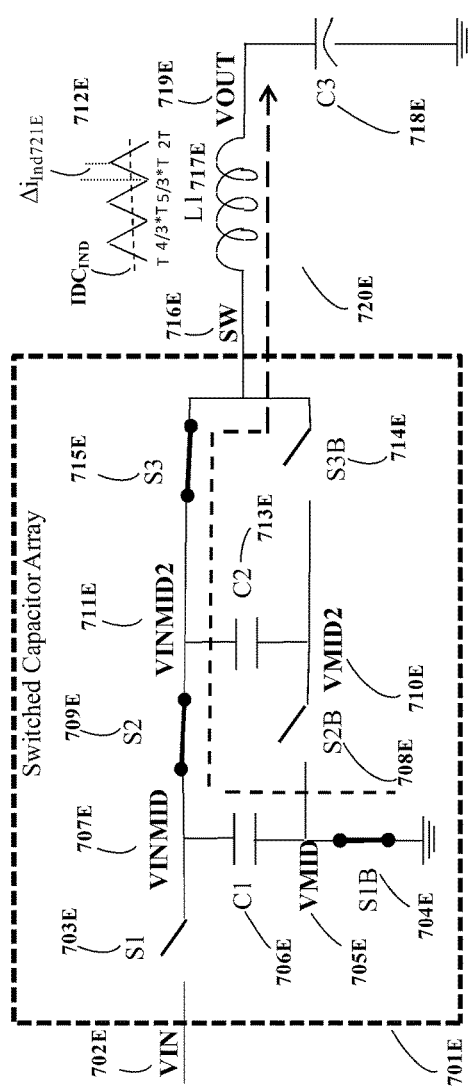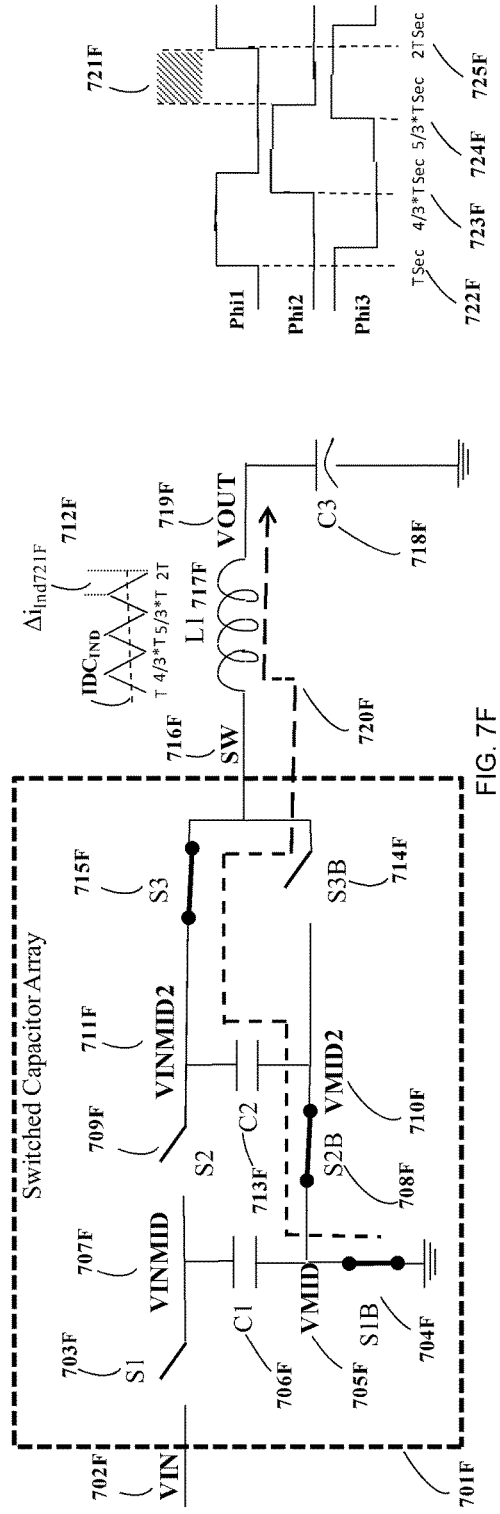
FIG. 7E
FIG. 7F

| Phases ON | Illustration | Switches Closed | Capacitor State | Voltage on SW Node |
|---|---|---|---|---|
| None | Figures 6B, 6D, 6F | S1B, S2B, S3B | Hold | Zero |
| Phi 1 | Figures 6A, 7B | S1, S2B, S3B | C1- Charge<br>C2 - Hold | VIN/3 |
| Phi 2 | Figures 6C, 7D | S2, S1B, S3B | C1-Discharge<br>C2-Charge | VIN/3 |
| Phi 3 | Figures 6E, 7F | S3, S1B, S2B | C1-Hold<br>C2-Discharge | VIN/3 |
| Phi1, Phi2 | Figure 7C | S1, S2, S3B | C1-Hold<br>C2-Charge | 2VIN/3 |
| Phi2, Phi3 | Figure 7E | S2, S3, S1B | C1-Discharge<br>C2-Hold | 2VIN/3 |
| Phi1, Phi3 | Figure 7A | S1, S3, S2B | C1-Charge<br>C2-Discharge | 2VIN/3 |
| Phi1, Phi2, Phi3 | - | S1, S2, S3 | Hold | VIN |

FIG. 8

| | Figure of Performance (Higher is Better) | | | | | Comments |
|---|---|---|---|---|---|---|
| Factor | Power Supply Fig. 1A (Buck) | Power Supply Fig. 2A (Switch Cap) | Power Supply Fig. 3A (Two Stage) | Invention Power Supply | | |
| | | | | Fig. 4 | Fig. 12 | |
| Inductor current ramp up and down per cycle [EFreq] | 1 | N/A | 1 | 3 | N | Effective Switching Frequency |
| VIN/(Inductor Charge-Discharge Voltage Differential) [VRIP] | 1 | N/A | Variable 1,2,3 | 3 | N | For the power supply of Fig 3A, Inductor charge voltage depends on VIN, VOUT differential and is equal to VIN when VOUT is > 2/3*VIN. For the Power supply of the invention Fig 4, and Fig 12., the differential is always VIN/3 and VIN/N respectively |
| 1 / (Inductor ripple current) [IRIP] | 1 | N/A | Variable 1,2,3 | 9 | N*N | Is equal to (Efreq*VRIP) |
| 1 / (Output Voltage ripple) [VOUTRIP] | 1 | Very Small | Variable 1,2,3 | 27 | N*N*N | Is equal to IRIP*Efreq. For power supply in Fig 2A output ripple is quite high as charge is transferred between capacitors rather than inductor |
| 1 / (No. of switches in series between input and output) [SwitchNum] | 1 | 1/2 | 1/5 | 1/3 | 1/N | Even though there are additional switches for the power supply of Fig 4 and 12 compared to buck, these are low voltage devices (better ON resistance) with lower voltage swing (lower switching losses) thus resulting in smaller area and better efficiency [DevArea, Efficiency] |
| 1/ (Device Area) [DevArea] | 1 | 1 | Variable 3/5, 1/5 | 1 | 1 | Equal to SwitchNum*VIN/ Voltage rating of the switches. For the power supply of Fig 3A, the device rating depends on VOUT. If VOUT is < VIN/3, then the devices can be rated to VIN/3. If VOUT is > 2/3*VIN, the devices are rated for VIN. For power supply of the invention Fig. 4, the devices always see a maximum swing of VIN/3 even when VOUT is equal to VIN |
| Area*VIN/Voltage Swing [Efficiency] | 1 | Poor | Variable 9/5, 3/5 | 3 | N | Power Supply in Figure 3A has voltage swing equal to VIN/3 when VOUT < 1/3*VIN but equal to VIN when VOUT is > 2/3*VIN. For power supply of the invention Fig. 4, the devices always see a maximum swing of VIN/3 even when VOUT is equal to VIN |
| DevArea*Inductor Area Reduction [Power Supply Area] | 1 | N/A | Variable 3/5-27/5 | 27 | N*N*N | Inductor Area Reduction is equal to reduction in inductor ripple current i.e. IRIP |
| Capacitor Voltage Regulation Method | N/A | Charge Redistribution among Capacitors | | Controlling time duration of Inductor current flow through capacitors | | For Power supplies of Figure 2A and 3A, the current through charge redistribution among capacitors is uncontrolled causing large input voltage ripple. For Power supplies of Figure 4 and Fig 12, the current flowing in capacitors is equal to inductor current, thus input voltage ripple is equal to that of a buck. |
| Input voltage Ripple | Good | Poor | | Good | | |

Table 1. Performance Summary for Step Down Power Supplies

FIG. 13

| Factor | Figure of Performance (Higher is Better) | | | | | Comments |
|---|---|---|---|---|---|---|
| | Power Supply Fig. 1B (BOOST) | Power Supply Fig. 2B (Switch Cap) | Power Supply Fig. 3B (Two Stage) | Invention Power Supply Fig. 11 | Fig. 12 | |
| Inductor current ramp up and down per cycle [EFreq] | 1 | 1 | 1 | 2 | N | Effective Switching Frequency |
| VOUT/(Inductor Charge-Discharge Voltage Differential) [VRIP] | 1 | N/A | Variable 1,2 | 2 | N | For the power supply of Fig 3B, Inductor charge voltage depends on VIN, VOUT differential and is equal to VOUT when VOUT is < 2*VIN. For the Power supply of the invention Fig 11, and Fig 12., the differential is always VOUT/2 and VOUT/N respectively |
| 1 / (Inductor ripple current) [IRIP] | 1 | N/A | Variable 1,2 | 4 | N*N | Is equal to (Efreq*VRIP) |
| 1 / (Input Voltage ripple) [VINRIP] | 1 | Very Small | Variable 1,2 | 8 | N*N*N | Is equal to IRIP*Efreq. For power supply in Fig 2B output ripple is quite high as charge is transferred between capacitors rather than inductor |
| 1 / (No. of switches in series between input and output) [SwitchNum] | 1 | 1/2 | 1/3 | 1/2 | 1/N | Even though there are additional switches for the power supply of Fig 11 and 12 compared to buck, these are low voltage devices (better ON resistance) with lower voltage swing (lower switching losses) thus resulting in smaller area and better efficiency [DevArea, Efficiency] |
| 1/ (Device Area) [DevArea] | 1 | 1 | Variable 2/3, 1/3 | 1 | 1 | Equal to SwitchNum*VOUT/ Voltage rating of the switches. For the power supply of Fig 3B, the device rating depends on VOUT. If VOUT is > 2*VIN, then the devices can be rated to VOUT/2. If VOUT is < 2*VIN, the devices are rated for VOUT. For power supply of the invention Fig. 11, the devices always see a maximum swing of VOUT/ 2 even when VOUT is < 2*VIN |
| Area*VOUT/Voltage Swing [Efficiency] | 1 | Poor | Variable 4/3, 2/3 | 2 | N | Power Supply in Figure 3B has voltage swing equal to VOUT/2 when VOUT > 2*VIN but equal to VOUT when VOUT is < 2*VIN. For power supply of the invention Fig. 11, the devices always see a maximum swing of VOUT/2 even when VOUT is < 2*VIN |
| DevArea*Inductor Area Reduction [Power Supply Area] | 1 | N/A | Variable 1/3-4/3 | 8 | N*N*N | Inductor Area Reduction is equal to reduction in inductor ripple current i.e. IRIP |
| Capacitor Voltage Regulation Method | N/A | Charge Redistribution among Capacitors | Controlling time duration of Inductor current flow through capacitors | | | For Power supplies of Figure 2B and 3B, the current through charge redistribution among capacitors is uncontrolled causing large output voltage ripple. For Power supplies of Figure 11 and Fig 12, the current flowing in capacitors is equal to inductor current, thus output voltage ripple is equal to that of a boost. |
| Output voltage Ripple | Good | Poor | Good | | | |

Table 2. Performance Summary for Step Up Power Supplies

METHOD AND APPARATUS FOR SWITCHED CAPACITOR AND INDUCTOR BASED-SWITCH MODE POWER SUPPLY

FIELD OF THE INVENTION

The present invention pertains to power supplies and regulators. More particularly, the present invention relates to Method and Apparatus for Switch Mode Power Supply.

BACKGROUND OF THE INVENTION

The advent of low voltage digital circuitry in present day electronics resulted in the use of many power converters which, for example, take the input power supply, ex. battery power, and down convert the battery voltage to a voltage suitable for operation of the electronic circuitry. Switch mode power supplies are needed and used in many electronic devices as they are more efficient in power conversion than linear regulator power supplies. Switch mode power supplies can be either magnetic based or capacitor based.

FIG. 1A shows a magnetics (inductor L1 106) based synchronous step down (Buck) DC-DC converter, which converts the input voltage VIN 103 to a lower output voltage VOUT 108. Transistors 104 and 105 are controlled by gates 101 and 102 respectively, to drive SW 119. Inductor L1 106 output VOUT 108 is filtered by capacitor 107 to supply LOAD 109.

FIG. 1B shows a magnetics (inductor L2 113) based step up (Boost) converter which converts VIN 111 to a higher voltage at the output VOUT 117. Transistors 112 and 114 are controlled by gates 110 and 115 respectively, to drive SW 120. VOUT 117 is filtered by capacitor 116 to supply LOAD 118.

Magnetics based converts are efficient but need magnetic components like Inductors and transformers which are bulky. In addition to making electronic devices bigger, the bulky magnetic components, due to their larger height, have a further disadvantage that they cannot be co-packaged with the components they are powering. As the converters are placed further away from the components they are powering, the increased parasitic trace resistances and capacitors further decrease the conversion efficiency and bandwidth. Furthermore, as the current in the magnetic component cannot be changed instantaneously, the presence of magnetic components limits the loop bandwidth of the converter.

Another conversion approach is the use of a switch capacitor based converter. FIG. 2A shows a ½ step down converter and FIG. 2B shows a 2× step up converter. This type of converter does not need the bulky magnetic components like inductors. However, switched capacitor based converters are only efficient when the output is a ratio of the input voltage and in addition, the output voltage regulation is poor thus requiring post regulation.

For example, in the switched capacitor converter of FIG. 2A, the output voltage VOUT 208 is equal to the half of the input voltage VIN 201. If VIN, as an example, is a Li-Ion battery, the voltage VIN 201 could be varying between 3V-4.3V. If the required output at VOUT 208 is 1.8V and when the voltage at voltage VIN is 4.3V, the switched capacitor converter ideally provides a voltage of 4.3V/2=2.15V at VOUT which is higher than the required voltage of 1.8V thus needing a post regulator which converts the switched capacitor output voltage of 2.15V to 1.8V. If the post regulator is a linear regulator, then the difference in voltage of the output of switched capacitor converter and the required regulated output voltage is dissipated, in the example (2.15V−1.8V)*Load current, as heat, thus decreasing the efficiency of the converter.

In FIG. 2A switch S1 202, and switch S4 206 connect to one side of capacitor C1 204. The other side of capacitor C1 204 connects to switch S2 203 and switch S3 205. The other side of switch S1 202 connects to VIN 201. The other side of switch S 203 connects to ground. The other side of switch S3 205 and switch S4 206 each connect to VOUT 208 which is connected to capacitor C2 207 and LOAD 209. The other side of C2 207 and LOAD 209 each connect to ground.

For example, in the switched capacitor converter of FIG. 2B, the output voltage VOUT 217 is equal to the twice the input voltage VIN 210.

In FIG. 2B switch S1B 212 and switch S2B 211 are each connected to VIN 210. The other side of switch S1B 212 is connected to one side of capacitor C1B 214 and switch S4B 216, and the other side of capacitor C1B is connected to the other side of switch S2B 211, and switch S3B 213. The other side of switch 213 is connected to ground. The other side of switch S4B 216 is connected to capacitor C2B and VOUT 217. The other side of capacitor C2B 215 is connected to ground. Load 218 on one side is connected to VOUT 217 and on the other side to ground.

FIG. 2C illustrates an example clock waveform Phi1 219 and Phi2 220 for a switched capacitor converter.

FIG. 3A and FIG. 3B illustrate cascaded converters consisting of two switch mode converters cascaded in series such that the output of the first switch mode converter generates an intermediate voltage which is in between the input voltage and the required output voltage. This intermediate voltage acts as the input to the second stage. FIG. 3A shows a step down converter which could be used when the input to output ratio is wide. 301A is a switched capacitor converter which converts voltage at VIN 303A to a lower value equal to, as an example, VIN/3 at the intermediate node VINT 315A. The inductor based buck converter 302A steps down the intermediate voltage at VINT 315A, in this example equal to VIN/3, to the required voltage. Since the inductor based second stage 302A is operating from a lower voltage at VINT 315A compared to VIN 303A and since switching losses are proportional to the square of the switching voltage, the second stage converter could be run at a higher frequency than a switcher running directly from the input VIN 303A. Because of this higher switching frequency, the inductor L1 320A could be made smaller compared to a single stage inductor based switcher. Despite the benefit of the smaller inductor, the two stage conversion still suffers from the efficiency loss which is the product of the individual efficiencies of each stage. As an example if the switched capacitor stage has an efficiency of 90% and the inductor based second stage has an efficiency of 90%, then the overall efficiency is the product of the two, thus equal to 0.9*0.9=81% which is lower than the efficiency of a single stage conversion. Furthermore, the two stage conversion requires additional components like CINT 314A to hold the intermediate voltage VINT 315A and power devices 318A, 319A compared to a single stage conversion. Further, if the voltage at VIN 303A is closer to the required voltage at VOUT 322A, for example generating 3.3V output from a 3.7V Li-Ion battery, then the two stage conversion doesn't offer any benefit of decreased magnetic inductor size as the voltage on the intermediate node VINT 315A will now be similar in value to VIN 303A.

As illustrated in FIG. 3A switched capacitor array 301A has switches S1A 304A, S2A 305A, S3A 307A, S4A 308A which are connected to capacitor C1 306A as illustrated. Switches S3A 307A and S4A 308A are connected to switch S1B 309A. Switches S1B 309A, S2B 310A, S3B 312A, and S4B 313A are connected to capacitor C2 311A as illustrated.

Switches S3B 312A and S4B 313A are interconnected to VINT 315A as is CINT 314A as illustrated which connected to Inductor based Buck Converter 302A.

As illustrated in FIG. 3A Inductor based Buck Converter 302A has transistors 318A and 319A having gates 316A and 317A respectively. Inductor L1 320A is connected to capacitor C3 321A and VOUT as illustrated.

VOUT 322A is connected to LOAD 323A.

FIG. 3B illustrates a cascaded two stage step up converter taking as an input VIN 303B. At 301B is an Inductor Based Boost Converter and at 302B is a Switch Capacitor Array.

301B an Inductor Based Boost Converter has an inductor L1 305B coupled to transistors 306B and 307B as illustrated. Transistors 306B and 307B have gates 304B and 308B respectively. Transistor 307B is coupled to VINT 310 and CINT 309B.

302B a Switch Capacitor Array is coupled to VINT 310B and has switches S1 312B and S2 311B. Switch S1 312B is coupled to C1 314B and switch S4 315B. Switch S2 311B is coupled to capacitor C1 314B and switch S3 313B as illustrated. Switch S4 315 is coupled to capacitor C1 314B and VOUT 317B as illustrated.

VOUT 317B is coupled to capacitor C2 316B and LOAD 318B.

Thus there is a need for a power supply which is compact, efficient, which offers wider bandwidth without impacting conversion efficiency and which is integration friendly with the components it is powering. This presents a technical problem for which a technical solution using a technical means is needed.

BRIEF DESCRIPTION OF THE DRAWINGS

The invention is illustrated by way of example and not limitation in the figures of the accompanying drawings.

FIG. 2A illustrates a switched capacitor based step down converter.

FIG. 2B illustrates a switched capacitor based step up converter.

FIG. 2C illustrates an example clock waveform for the switched capacitor converters.

FIGS. 6A, 6B, 6C, 6D, 6E, and 6F illustrate the operation of one embodiment of the present invention during different time intervals when there is no overlap in the control signals.

FIGS. 7A, 7B, 7C, 7D, 7E, and 7F illustrate the operation of one embodiment of the present invention during different phases when two control signals overlap.

FIG. 8 illustrates several combinations of switching states for one embodiment of the present invention.

FIG. 13 is a performance summary for step down power supplies.

FIG. 14 is a performance summary for step up power supplies.

DETAILED DESCRIPTION

The invention, in one embodiment, is a power supply which provides a reduced switching voltage which results in a more efficient power supply resulting in longer battery run time.

In one embodiment of the invention there is provided a power supply which can change its output voltage faster under transients which results in a smaller output capacitor needed and smaller transient voltage spikes in the output voltage.

In one embodiment of the invention, there is provided a power supply which provides a reduced switching frequency inductor current ripple and output voltage ripple which enables the use of a much smaller, low profile inductor, and output capacitor thus enabling co-packaging of the power supply with the load IC (Integrated Circuit), thus further decreasing efficiency loss due to trace parasitics.

In one embodiment of the invention, there is provided a power supply which uses lower voltage rated devices thus further enabling integration of the power supply with the low voltage digital process compatible with the SoC (System on Chip).

In one embodiment of the invention, without increasing the switching frequency of the power supply which increases switching losses and hence decreases the efficiency, a fast responding power supply is provided.

In one embodiment of the invention, without increasing the switching frequency of the power supply, a power supply with decreased passive component size is provided.

In one embodiment of the invention, without using cascaded two stage conversion which increases the number of components and decreases efficiency, a small, efficient and fast power supply is provided.

In one embodiment of the invention, even when input voltage is varying and not widely separated from the output voltage, a power supply with decreased passive component size and faster response time is provided (compared with a two stage cascaded power supply).

In one embodiment of the invention, even when input voltage is varying and not widely separated from the output voltage, without using a two stage cascaded power supply, a power supply with decreased passive component size and faster response time is provided.

Figure 4:
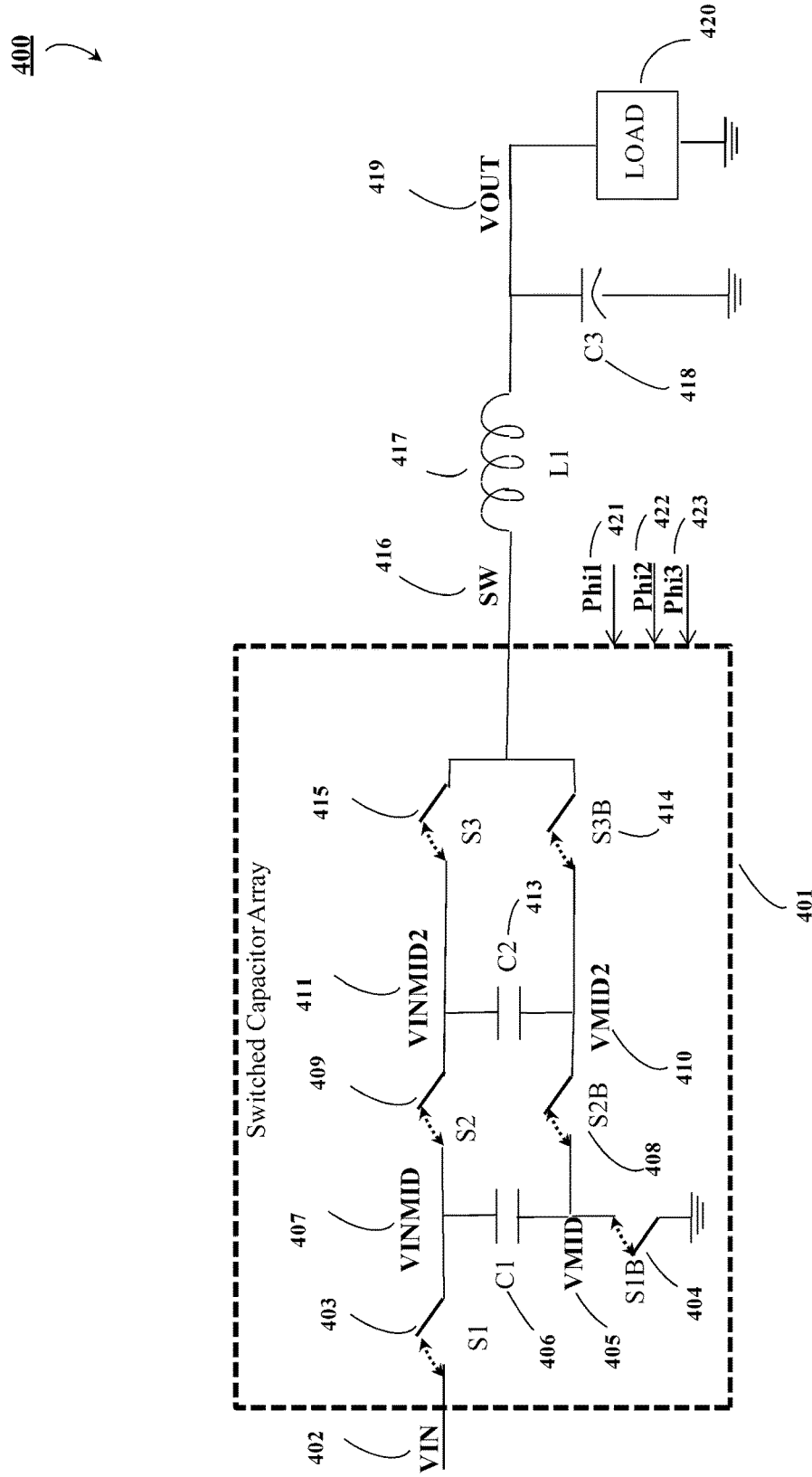
FIG. 4 illustrates one embodiment of the present invention.

FIG. 4 illustrates, generally at 400, one embodiment of the invention. The power supply system 400 is an example of a step down converter of the present invention. It includes a switched capacitor array 401 connected to input power supply VIN 402 and the output SW 416 from the switched capacitor array 401 is connected to one terminal of the inductor L1 417 and the second terminal of the inductor L1 417 is connected to the load 420 at the output node VOUT 419 of the power supply. A filter capacitor C3 418 is across the load 420.

The switched capacitor array 401 consists of three semiconductor switches (for example, transistors) S1 403, S2 409, and S3 415 which are in series between the input VIN 402 and the switched capacitor array 401 output SW 416, and three switches S1B 404, S2B 408, and S3B 414 between SW 416 node and ground. Switches S1 403 and S1B 404 are complimentary, i.e. when S1 403 is ON; S1B 404 is OFF and vice versa. Similarly, S2 409 and S2B 408, and S3 415 and S3B 414 are complimentary. The state of the switches, whether they are open (OFF) or closed (ON), is controlled by the signals Phi1 421, Phi2 422 and Phi3 423. As an example, signal Phi1 421 controls switches S1 403 and S1B 404, when Phi1 421 is high S1 403 is closed (ON) and S1B 404 is open (OFF) and vice versa. Similarly signal Phi2 422 controls switches S2 409 and S2B 408 and Phi3 423 controls switches S3 415 and S3B 414. The switch capacitor array 401 also has two capacitors C1 406 (connected between the nodes VINMID 407 and VMID 405) and C2 413 (connected between the nodes VINMID2 411 and VMID2 410). In this embodiment of the invention, the capacitor C1 406 is regulated to a voltage equal to ⅔ times the voltage at the input VIN 402, (i.e. the voltage differential between the nodes VINMID 407 and VMID 405 is equal to ⅔*VIN 402 with node VINMID 407 at a higher potential with respect to node VMID 405) and the capacitor C2 413 is regulated to a voltage equal to ⅓ times the voltage at VIN 402 with voltage at node VINMID2 411 being higher than node VMID2 410 by ⅓*VIN 402.

Figure 5:
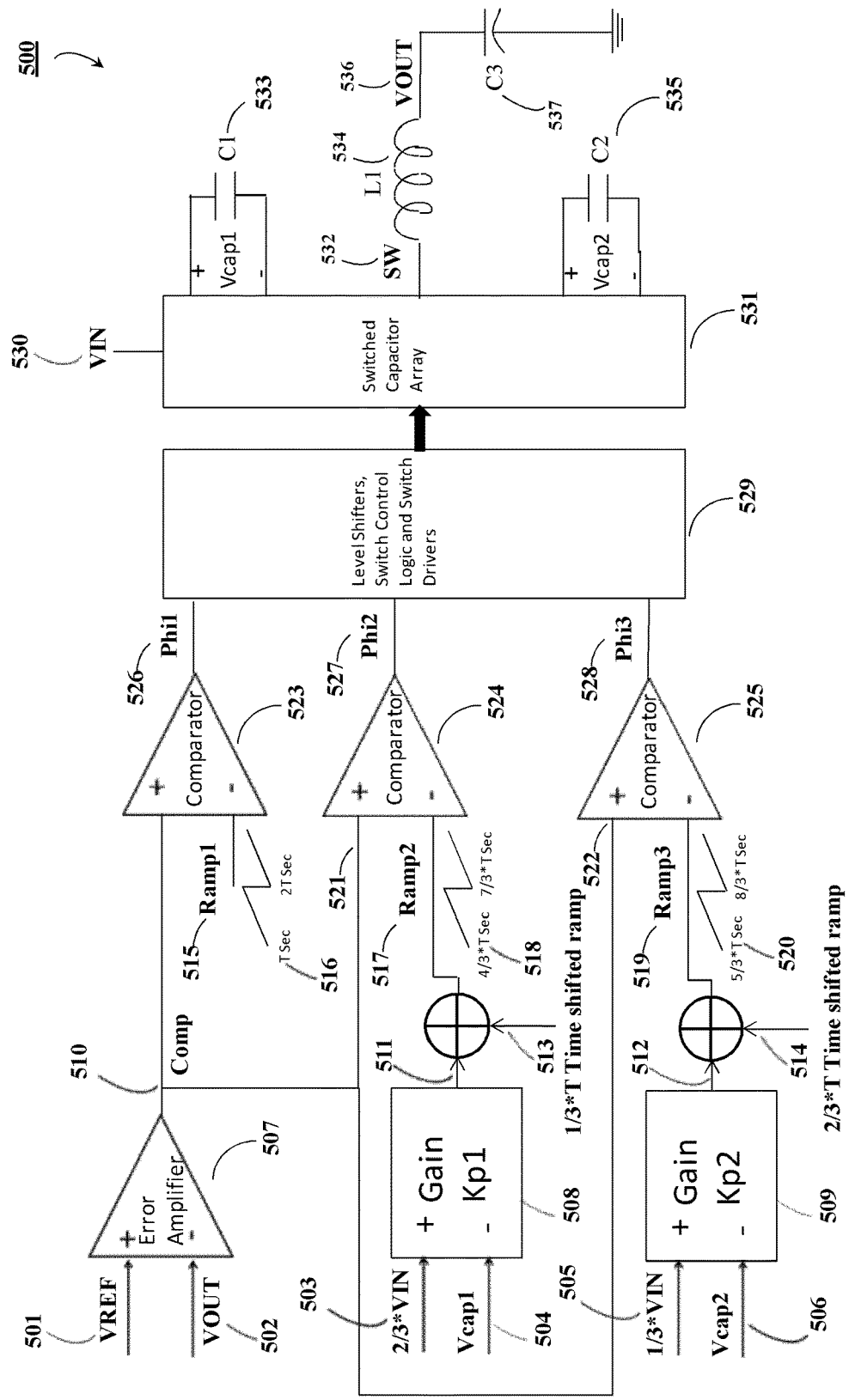
FIG. 5 illustrates one embodiment of generation of control signals for driving the switches in the switched capacitor array of the present invention.

Shown in FIG. 5 is an example control loop 500 for the power supply 400 of FIG. 4 which generates the control signals Phi1 (e.g. 421, 526), Phi2 (e.g. 422, 527), Phi3 (e.g. 423, 528) and also regulates the output voltage VOUT (e.g. 419, 536) and the charges in capacitors C1 (e.g. 406, 533) and C2 (e.g. 413, 535). Although the control loop 500 shown is for a pulse width modulation (PWM) scheme, the principles are equally applicable for other modulation schemes like hysteretic control, constant ON time, etc. The generation of Phi1 526 uses the error amplifier 507 to compare a reference signal VREF 501 to the output voltage VOUT 502 and generates the COMP 510 control signal. The COMP 510 control signal is compared to a ramp signal Ramp1 515 by comparator 523. The Ramp1 515 signal can be a voltage mode ramp or could include a peak current sense ramp, etc. Illustrated at 516 is a sample waveform for Ramp1 515. If the output voltage VOUT 536 (sensed at 502) is lower than the required reference voltage VREF 501, the error amplifier 507 brings the COMP 510 signal higher. Since the COMP 510 signal is now higher, it takes more time for the Ramp1 515 signal to reach the COMP 510 value, thus the Phi1 526 signal is higher for a longer time duration (since Phi1 526 is the duty cycle, duty cycle is therefore increased). This increased Phi1 526 signal duration causes inductor L1 534 current to ramp up longer, thus bringing VOUT 536 higher and in regulation with respect to VREF 501. Similarly, VOUT 536 (sensed at 502) is regulated when it is higher the VREF 501 by decreasing the high duration (Duty Cycle) of Phi1 526. Also shown in FIG. 5 is block 529 which interfaces between the Phi1 526, Phi2 527, and Phi3 528 controls and the switched capacitor array 531 (including capacitors C1 533, and C2 535) having an output SW 532 that goes to inductor L1 534 to Vout 536 and capacitor C3 537.

Similarly, the comparators 524 and 525 use the same COMP 510 signal, used by the comparator 523 (shown at 521, and 522 respectively), to generate Phi2 527 and Phi3 528 signals respectively. Ramp2 517 signal is generated by time shifting the Ramp1 515 by ⅓ times one clock period T Sec (seconds) (513) and adding a signal 511 equal to kp1*(⅔*VIN (503)−Vcap1 (504)) generated by the proportional gain block 508. For the power supply 400, Vcap1 504 is the voltage stored in capacitor C1 406. Also shown in FIG. 5 is the Vcap1 voltage across capacitor C1 533. As mentioned above since the voltage stored in the capacitor C1 406 in steady state is made equal to ⅔*VIN (where VIN, shown as 402 in FIGS. 4 and 530 in FIG. 5, is the voltage of the input power source), the output 511 of the proportional gain block 508 is zero as (⅔*VIN−Vcap1) equals zero. Thus in steady state Ramp2 517 is identical to Ramp1 515 other than it is time shifted from Ramp1 515 by ⅓*T Sec (513). Since comparator 524 is using the same COMP 510 signal and compares it with Ramp2 517 and generates Phi2 527, in steady state when capacitor C1 (e.g. 406, 533) voltage is regulated, Phi2 (e.g. 422, 527) resembles Phi1 (e.g. 421, 526) (that is, high and low durations match that of Phi1 526) and it is just a time shifted version of Phi1 526 shifted in time from Phi1 526 by ⅓*T Sec 513. Illustrated at 518 is a sample waveform for Ramp2 517.

If the voltage across the capacitor C1 (e.g. 406, 533) goes out of regulation, for example, is lower than the required voltage of ⅔*VIN (e.g. 402, 530), then the output 511 of the proportional gain block 508 is non zero and goes higher, thus causing the Ramp2 517 to go higher, this makes the output of the comparator 524 to go low sooner as Ramp2 crosses COMP 510 voltage sooner, thus reducing the time during which Phi2 527 is high. If the high time of Phi2 527 is decreased, as the capacitor C1 (e.g. 406) is discharged when Phi2 527 is high (as shown, and explained later, during time slots 621C in FIG. 6C, 721D in FIGS. 7D and 721E in FIG. 7E), the amount of discharge of capacitor C1 (e.g. 406) is decreased compared to the charge build up time in C1 (e.g. 406). Thus the voltage stored in C1 (e.g. 406) keeps building up until it reaches the steady state value of ⅔*VIN (e.g. 402, 530). Similarly opposite action takes place when C1 (e.g. 406) has a higher voltage than ⅔*VIN (e.g. 402) until it reaches the steady state regulated value of ⅔*VIN (e.g. 402).

Similarly, the comparator 525 uses the same COMP 510 signal used by the comparator 523 to generate Phi3 528 signal. Ramp3 519 signal is generated by time shifting the Ramp1 515 by ⅔ times one clock cycle period T Sec (514) and adding a signal 512 equal to kp2*(⅓*VIN (505)−Vcap2 (606)) generated by the proportional gain block 509. For the power supply 400, Vcap2 506 is the voltage stored in capacitor C2 413. Also shown in FIG. 5 is the Vcap2 voltage across capacitor C2 535. As mentioned above since the voltage stored in the capacitor C2 (e.g. 413) in steady state is made equal to ⅓*VIN (where VIN, shown as 402 in FIGS. 4 and 530 in FIG. 5, is the voltage of the input power source), the output 512 of the proportional gain block 509 is zero as (⅓*VIN−vcap2) equals zero. Thus in steady state Ramp3 519 is equal to Ramp1 515 other than it is time shifted from Ramp1 515 by ⅔*T Sec. Since comparator 525 is using the same COMP 510 signal and compares it with Ramp3 519 and generates Phi3 528, in steady state when capacitor C2 (e.g. 413) voltage is regulated, Phi3 528 exactly resembles Phi1 526 (that is, high and low durations match that of Phi1 526) and it is just a time shifted version of Phi1 526, shifted in time from Phi1 526 by ⅔*T sec (514). Illustrated at 520 is a sample waveform for Ramp3 519.

If the voltage across the capacitor C2 (e.g. 413, 535) goes out of regulation, as an example is lower than the required voltage of ⅓*VIN 505, then the output 512 of the proportional gain block 509 is non zero and goes higher, thus causing the Ramp3 519 to go higher, this makes the output of the comparator 525 to go low sooner as Ramp3 519 crosses COMP 510 voltage sooner, thus reducing the time during which Phi3 528 is high. If the high time of Phi3 528 is decreased, as the capacitor C2 (e.g. 413, 535) is discharged when Phi3 528 is high (as shown, and explained later, during time slots 621E in FIG. 6E, 721A in FIGS. 7A and 721F in FIG. 7F), the amount of discharge of capacitor C2 (e.g. 413, 535) is decreased compared to the charge build up time in C2 (e.g. 413, 535). Thus the voltage stored in capacitor C2 (e.g. 413, 535) keeps building up until it reaches the steady state value of ⅓*VIN 505. Similarly, the opposite action takes place when C2 (e.g. 413, 535) has a higher voltage than ⅓*VIN 505 until it reaches the steady state regulated value of ⅓*VIN 505.

Thus in the steady state when the voltages of the capacitors C1 (e.g. 406, 533) and C2 (e.g. 413, 535) are in regulation, the high and low time durations of Phi2 527 and Phi3 528 match each other and match that of Phi1 526. Phi1 526, Phi2 527, and Phi3 528 will become time shifted versions of each other, time shifted by ⅓*T sec from the previous signal, each representing the duty cycle of the converter.

FIGS. 6A through 6F illustrate the operation of the power supply 400 (FIG. 4) when voltage at the input VIN 402 is higher than 3 times the required voltage at the output VOUT 419. As apparent to one skilled in the art, the duty cycle of a buck converter in the steady state continuous mode of operation is ideally given by the ratio of VOUT 419 and VIN 402, i.e. D (Duty Cycle)=VOUT/VIN. Thus, when VIN 402 is higher than 3 times VOUT 419, the duty cycle (D) is less than ⅓.

As discussed above the switched capacitor array is controlled by the control signals Phi1 (e.g. 421, 526), Phi2 (e.g. 422, 527), and Phi3 (e.g. 423, 528). Phi1 (e.g. 421, 526) is similar to the duty cycle of a standard buck converter. Thus, when VIN (e.g. 402, 530) is higher than 3 times VOUT (e.g. 419, 536), the duty cycle (high time) is less than 0.33 as shown in the waveform for Phi1 (e.g. 421, 526) in FIG. 6A at 621A. As discussed above, Phi2 (e.g. 422, 527) and Phi 3 (e.g. 423, 528) are similar to Phi1 (e.g. 421, 526) but are time shifted from the previous signal by ⅓ times clock period T. For example, if Phi1 (e.g. 421, 526) goes high at T Sec (as shown at time instant 622A in FIG. 6A), Phi2 (e.g. 422, 527) is time shifted to go high at (T+⅓*T)=4/3*T Sec (as shown at 623A) and Phi3 (e.g. 423, 528) to go high at (4/3*T+⅓*T)=5/3*T Sec (as shown at 624A) and Phi1 (e.g. 421, 526) goes high again at 5/3*T+⅓*T=2T (as shown at 625A). Thus, in the case where VIN 602A is higher than 3 times VOUT 619A and since the duty cycle is less than ⅓ and because Phi1 (e.g. 421, 526), Phi2 (e.g. 422, 527), and Phi3 (e.g. 423, 528) are time shifted by ⅓*T from the previous, there is no overlap of Phi1 (e.g. 421, 526), Phi2 (e.g. 422, 527), and Phi3 (e.g. 423, 528) high states.

Figure 6A:
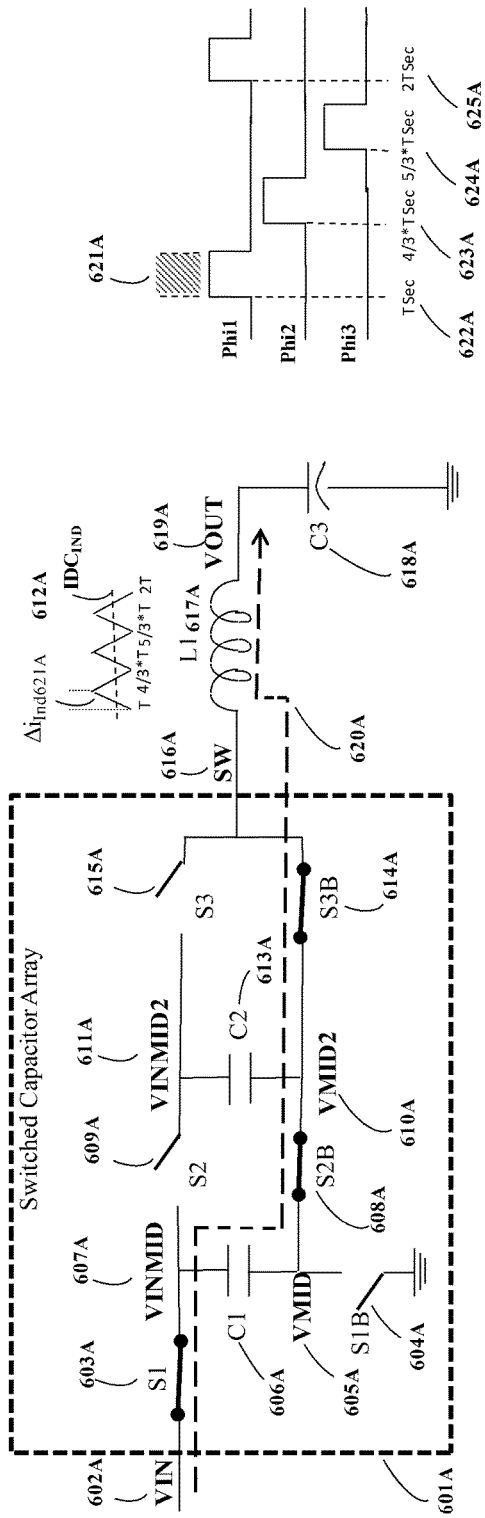

601A in FIG. 6A represents the states of switches in the switched capacitor array during the time when only Phi1 (e.g. 421, 526) is high (i.e. during the time interval shown at 621A). Phi1 (e.g. 421, 526) controls switches S1 603A and S1B 604A, Phi2 (e.g. 422, 527) controls S2 609A and S2B 608A, and Phi3 (e.g. 423, 528) controls S3 615A and S3B 614A. When a Phi signal (e.g. Phi1, Phi2, Phi3) is high, the corresponding switch (e.g. S1, S2, S3) is closed and the corresponding complimentary switch (e.g. S1B, S2B, S3B) is open and when a Phi signal is low, the corresponding switch is open and its complimentary switch is closed. Thus, during the time 621A when only Phi1 is high and Phi2 and Phi3 are low, switch S1 is closed and switches S2 and S3 are open. Complimentary switches S1B is open, S2B and S3B are closed as shown in 601A in FIG. 6A.

The dashed line 620A represents the current flow in this state. In this state, the current through Inductor L1 617A is flowing from input source at VIN 602A through the closed switch S1 603A, capacitor C1 606A, closed switches S2B 608A and S3B 614A to the output VOUT 619A through SW 616A and L1 617A to C3 618A. As mentioned above, since C1 606A is regulated to a voltage equal to ⅔*VIN, the voltage at SW node 616A in this state is approximately equal to (VIN−⅔*VIN)=⅓*VIN (ignoring the voltage drop across the closed switches S1 603A, S2B 608A, and S3B 614A which are sized to minimize the drop across them for optimum efficiency). Thus the voltage across the inductor L1 617A is (⅓*VIN−VOUT). Since, in this case, ⅓*VIN is higher than VOUT 619A, the inductor (L1 617A) current will be ramping up in value around its DC value $IDC_{IND}$ by $\Delta i_{Ind621A}$, as shown in FIG. 6A at 612A and the net increase in charge delivered to VOUT 619A during this time being equal to $\Delta i_{Ind621A}*T_{621A}$, where $\Delta i_{Ind621A}$ is the net change in inductor current during the time 621A and $T_{621A}$ is equal to the time interval shown in 621A (i.e. during the time when Phi1 is high at 621A). In addition, since the current flowing through the capacitor C1 606A is equal to the current flowing through the inductor L1 617A and to the output VOUT 619A in this state, the net increase in charge stored in the capacitor C1 606A around its DC steady state value of ⅔VIN is equal to the average inductor current during this time period 621A (which is equal to the DC value of the inductor current $IDC_{IND}$ multiplied by the time duration i.e. equal to $IDC_{IND}*T_{621A}$ In the configuration as shown in FIG. 6A, node VINMID 607A is equal to VIN 602A (minus any voltage drop across switch S1 603A). Node VINMID2 611A is only connected to capacitor C2 613A and does not contribute to VOUT 619A. Node VMID 605A and node VMID2 610A are at the same potential (minus any voltage drop across switch S2B 608A). VOUT 619A is connected to capacitor C3 618A.

Figure 6B:
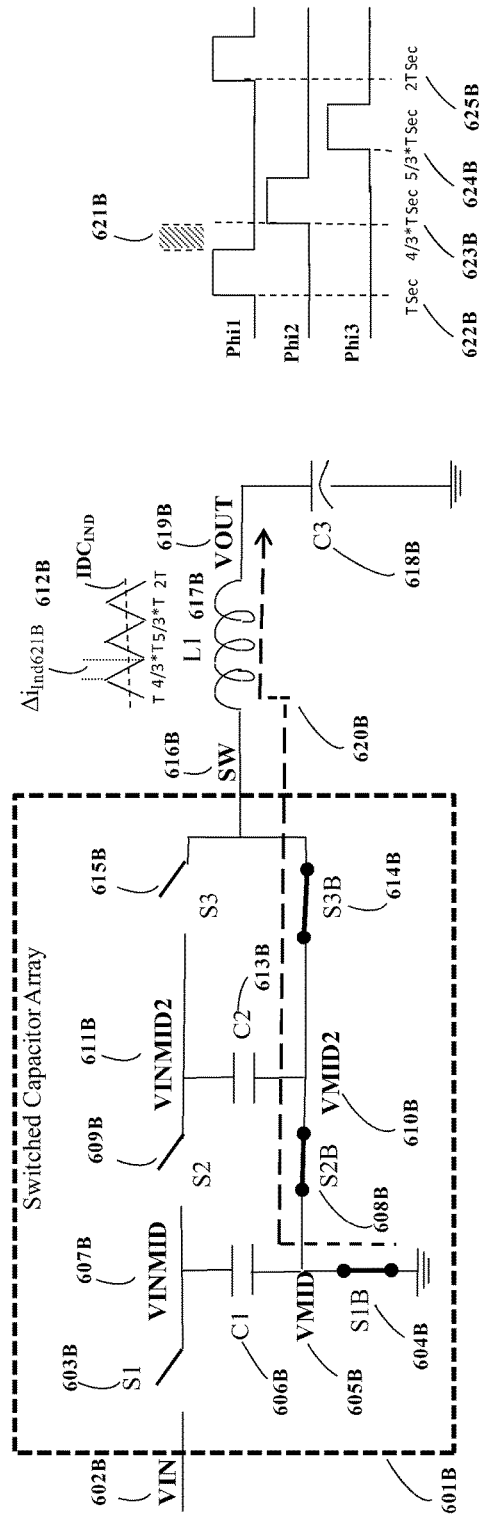

FIG. 6B shows the state of the power supply during the time period 621B where Phi1, Phi2 and Phi3 are all low thus making switches S1 603B, S2 609B, and S3 615B open and their complimentary switches S1B 604B, S2B 608B, and S3B 614B closed. The inductor L1 617B current path in this state is shown by the dashed line 620B. Since there is no path for current to flow through capacitors C1 606B and C2 613B, there is no net change in the charge stored in them during this time period 621B.

Ignoring the voltage drops across the closed switches S1B 604B, S2B 608B, and S3B 614B, the voltage at SW node 616B in this state is equal to zero as is the voltage at node VMID 605B and node VMID2 610B. Thus, the voltage across the inductor L1 617B now is negative compared to the state in FIG. 6A. This negative voltage across inductor L1 617B causes its current to decrease in value around its DC steady state value $IDC_{IND}$ as shown by ΔiInd621B in FIG. 6B at 612B and the net decrease in charge delivered to VOUT 619B during this time is equal to $\Delta i_{Ind621B}*T_{621B}$, where $\Delta i_{Ind621B}$ is the net change in inductor current during the time 621B and $T_{621B}$ is equal to the time shown in 621B.

Since in steady state, output voltage VOUT is regulated by the control loop, and in addition, as further discussed with respect to control loop regulation in FIG. 5, since Phi2 and Phi3 time intervals are symmetrical (but just shifted in time) to that of Phi1, the net increase in inductor current $\Delta i_{Ind621A}$ at 612A during time interval 621A must be equal to net decrease in Inductor current $\Delta i_{Ind621B}$ at 612B during time interval 621B. As an example, if the net increase in Inductor current is higher than the net decrease, then the inductor current will keep on increasing from its DC value every clock cycle, causing output voltage VOUT to go out of regulation. This will make the control loop respond (as explained above with respect to FIG. 5) and decrease the high time (i.e. duty cycle) of Phi1 and hence will make the interval 621A smaller with respect 621B such that $\Delta i_{Ind621A}$ at 612A equals $\Delta i_{Ind621B}$ at 612B and the output VOUT stays in regulation.

Thus during the time interval 621A and 621B, the inductor current has increased and decreased by the same amounts around its DC value and this inductor ripple current causes a ripple in the output voltage VOUT without changing its DC value. Also, during these time intervals 621A and 621B, the net charge in capacitor C1 is increased by $IDC_{IND}*T_{621A}$, whereas the net charge in capacitor C2 is held constant.

As shown in FIG. 6B VIN 602B is input to switched capacitor array 610B, however in this case VIN 602B is not connected via switch S1 603B to any other component. Node VMID 607B is only connected to capacitor C1 606B, and node VINMID2 611B is only connected to capacitor C2 613B. VOUT 619B is connected to capacitor 618B. 622B, 623B, 624B, and 625B respectively indicate time T Sec, 4/3*T Sec, 5/3*T Sec, and 2T Sec.

FIG. 6C shows the state of power supply during the time interval 621C when only Phi2 is high. Since only Phi2 is high and Phi1 and Phi3 are low, switches S2 609C, S1B 604C, and S3B 614C are closed and switches S1 603C, S2B 608C, and S3 615C are open as shown in Switched Cpacitor Array 601C. This causes the inductor L1 617C current to flow from the closed switch S1B 604C through capacitor C1 606C through closed switch S2 609C through capacitor C2 613C and through closed switch S3B 614C to the output VOUT 619C as shown by the dashed line 620C. Since node VMID 605C is pulled to ground by the closed switch S1B 694C, the voltage at node VINMID 607C will be equal to the voltage stored on capacitor C1 606C which is equal to ⅔*VIN (ignoring small ac ripple component). Since capacitor C2 613C (which is charged to ⅓*VIN) is connected between node VINMID 611C and SW node 616C, the voltage at SW node 616C during this time interval 621C will be equal to (⅔*VIN−⅓*VIN) i.e. ⅓VIN. Thus again, during the time interval 621C, the voltage across the inductor L1 617C is (⅓*VIN−VOUT) which is same as that during time interval 621A. Thus, even though the switch capacitor configuration is different, the inductor and output behavior during the time interval 621C is symmetrical to that of 621A increasing the inductor current by $\Delta i_{Ind621C}$ shown at 612C. As explained above with respect to control loop operation in FIG. 5, in steady state when the voltage on capacitors C1 and C2 are in regulation, the time duration 621C will be equal to the time duration 621A. Since the voltage across the inductor L1 during the time intervals 621A and 621C is the same and since the time durations 621A and 621C are equal, the increase in inductor current $\Delta i_{Ind621C}$ shown at 612C during the time 621C is equal to the increase in inductor current $\Delta i_{Ind621A}$ shown at 612A during the time interval 621A.

During the time interval 621C, capacitor C1 606C is discharging as current is flowing out of it (as shown by dashed line 620C) and capacitor C2 613C is charging. Since the same current is flowing through capacitor C1 606C and capacitor C2 613C and inductor L1 617C, the net decrease in the charge of C1 606C is equal to the net increase in the charge of C2 613C and is equal to the average inductor L1 617C current multiplied by the time duration. The decrease in charge of C1 606C (and increase in charge of C2 613C) is therefore equal to $IDC_{IND}*T_{621C}$ where $T_{621C}$ is the time duration 621C. As discussed above since $T_{621C}$ is equal to $T_{621A}$, the net decrease in the charge of C1 (the net increase in charge of C2) is equal to $IDC_{IND}*T_{621A}$ which is exactly equal to the net increase in the charge of C1 during the time interval 621A. Thus at the end of the time interval 621C, there is no net change in the charge stored in the capacitor C1 and it remains charged at its steady state value of ⅔*VIN.

As shown in FIG. 6C VIN 602C is not connected to any other component in switched capacitor array 601C. Node VMID2 610 is connected to SW 616C, and VOUT 619C is connected to capacitor C3 618C. 622C, 623C, 624C, and 625C respectively indicate time T Sec, 4/3*T Sec, 5/3*T Sec, and 2T Sec.

FIG. 6D shows the state of the power supply during the time interval 621D. During this time interval 621D, Phi1, Phi2 and Phi3 are low and hence switches S1 603D, S2 609D, and S3 615D are open and switches S1B 604D, S2B 608D, and S3B 614D are closed in switched capacitor array 601D. The operation during this time interval 621D is same as that described during the time interval 621B and there is no net change in the charge of the capacitors C1 606D and C2 613D during this time interval 621D. Ignoring voltage drop across the switches node VMID 605D and node VMID2 and SW node 616D are at ground potential. VIN 602D is not connected to any component in switched capacitor array 601D. Node VINMID 607D is the voltage on capacitor C1, and node VINMID2 611 D is the voltage on capacitor C2 613D. Dashed line 620D represents the current flowing through inductor L1 617D. VOUT 619D is connected to capacitor C3 618D. Shown at 612D is inductor current $\Delta i_{Ind621D}$ (DC steady state value $IDC_{IND}$). 622D, 623D, 624D, and 625D respectively indicate time T Sec, 4/3*T Sec, 5/3*T Sec, and 2T Sec.

FIG. 6E shows the state of power supply during the time interval 621E when only Phi3 is high. Since only Phi3 is high and Phi1 and Phi2 are low, switches S3 615E, S1B 604E, and S2B 608E are closed and switches S1 603E, S2 609E, and S3B 614E are open as shown in switched capacitor array 601E. This causes the inductor L1 617E current to flow from the closed switches S1B 604E and S2B 608E, through capacitor C2 613E and through the closed switch S3 615E to the output VOUT 619E as shown by the dashed line 620E. Since node VMID2 610E is pulled to ground by the closed switches S1B 604E and S2B 608E, the voltage at node VINMID2 611E will be equal to the voltage stored in capacitor C2 613E which is equal to ⅓*VIN (ignoring small ac ripple component). Since node VINMID2 611E is connected to SW node 616E through closed switch S3 615E, the voltage at SW node 616E during this time interval 621E will be equal to ⅓*VIN. Thus again, during the time interval 621E, the voltage across the inductor L1 617E is (⅓*VIN−VOUT) which is the same as that during time intervals 621A and 621C. Thus, even though the switch capacitor configuration is different, the inductor and output behavior during the time interval 621E is symmetrical to that of 621A and 621C, increasing the inductor current by $\Delta i_{Ind621E}$ as shown at 612E. Since, in steady state when the voltage on capacitors C1 and C2 are in regulation, the signals Phi1, Phi2 and Phi3 are made symmetrical but just time shifted, the time duration 621E will be approximately equal to the time durations 621A and 621C. Since both the voltage across the inductor L1 during the time 621A (621C) and 621E and the time durations 621A (621C) and 621E are equal, the increase in inductor current $\Delta i_{Ind621E}$ shown at 612E during the time 621E is equal to the increase in inductor current $\Delta i_{Ind621A}$ ($\Delta i_{Ind621C}$) during the time interval 621A (621C).

During the time interval 621E, capacitor C2 613E is discharging as current is flowing out of it (as shown by dashed line 620E). Since the same current is flowing through capacitor C2 613E and Inductor L1 617E, the net decrease in the charge of C2 613E is equal to $IDC_{IND}*T_{621E}$ where $IDC_{IND}$ is the average value of the inductor current and $T_{621E}$ is the time duration 621E. As discussed above since $T_{621E}$ is equal to $T_{621C}$, the net decrease in the charge of C2 is equal to $IDC_{IND}*T_{621C}$ which is exactly equal to the net increase in the charge of C2 during the time interval 621C. Thus at the end of the time interval 621E, there is no net change in the charge stored in the capacitor C2 613E and it remains charged at its steady state value of ⅓*VIN. Since there is no path for current to flow through capacitor C1 606E, its voltage remains at its steady state value of ⅔*VIN during this time interval 621E. As shown in FIG. 6E VIN 602E goes to switched capacitor array 601E but is not connected to any component. Node VINMID 607E is connected to capacitor C1 606E. AMID 605E in this case is connected to ground via switch S1B 604E. VOUT 619E is connected to capacitor C3 618E. 622E, 623E, 624E, and 625E respectively indicate time T Sec, 4/3*T Sec, 5/3*T Sec, and 2T Sec.

FIG. 6F shows the state of the power supply during the time interval 621F. During this time interval 621F, Phi1, Phi2 and Phi3 are low and hence switches S1 603F, S2 609F, and S3 615F are open and switches S1B 604F, S2B 608F, and S3B 614F are closed in switched capacitor array 610F. The operation during this interval 621F is the same as that described during the time interval 621B and 621D and there is no net change in the charge of the capacitors C1 606F and C2 613F during this time interval 621F.

As shown in FIG. 6F, VIN 602F is presented to the switched capacitor array 601F but is not connected via switch S1 603F to any other components in Capacitor Array 601F. Node VINMID 607F is connected to capacitor C1 606F. Node VINMID2 611F is connected to capacitor C2 613F. Ignoring switch voltage drop node VMID 605F and node VMID2 610F are connected to ground. Inductor L1 617F current is shown by dashed line 620F flowing through switches S1B 604F, S2B 608F, S3B 614F through SW node 616F to VOUT 619F. VOUT 619F is connected to capacitor C3 618F. At 612F is shown the change in inductor current $\Delta i_{Ind621F}$. 622F, 623F, 624F, and 625F respectively indicate time T Sec, 4/3*T Sec, 5/3*T Sec, and 2T Sec.

Thus FIGS. 6A through 6F describe the operation of the power supply 400 in FIG. 4 for one complete clock period equal to T Sec. During this one clock cycle, inductor L1 is operated with three symmetrical phases, each phase further consisting of two time intervals—one which ramps up the inductor current and one which decreases it by the same amount. Thus, at the end of one clock cycle there is no net change in inductor current and hence in the output voltage VOUT. During this one clock cycle capacitor C1 is charged once (during time interval 621A) and discharged once (time interval 621C) by the same amount. Therefore in one clock cycle there is no net change in the capacitor C1 voltage and it remains charged at ⅔*VIN. Similarly during this one clock period, capacitor C2 is charged once (during 621C) and discharged once (during 621E) by the same amount. Therefore at the end of the clock cycle, C2 remains charged at ⅓*VIN. This operation is repeated in steady state for every cycle.

Figure 3A:
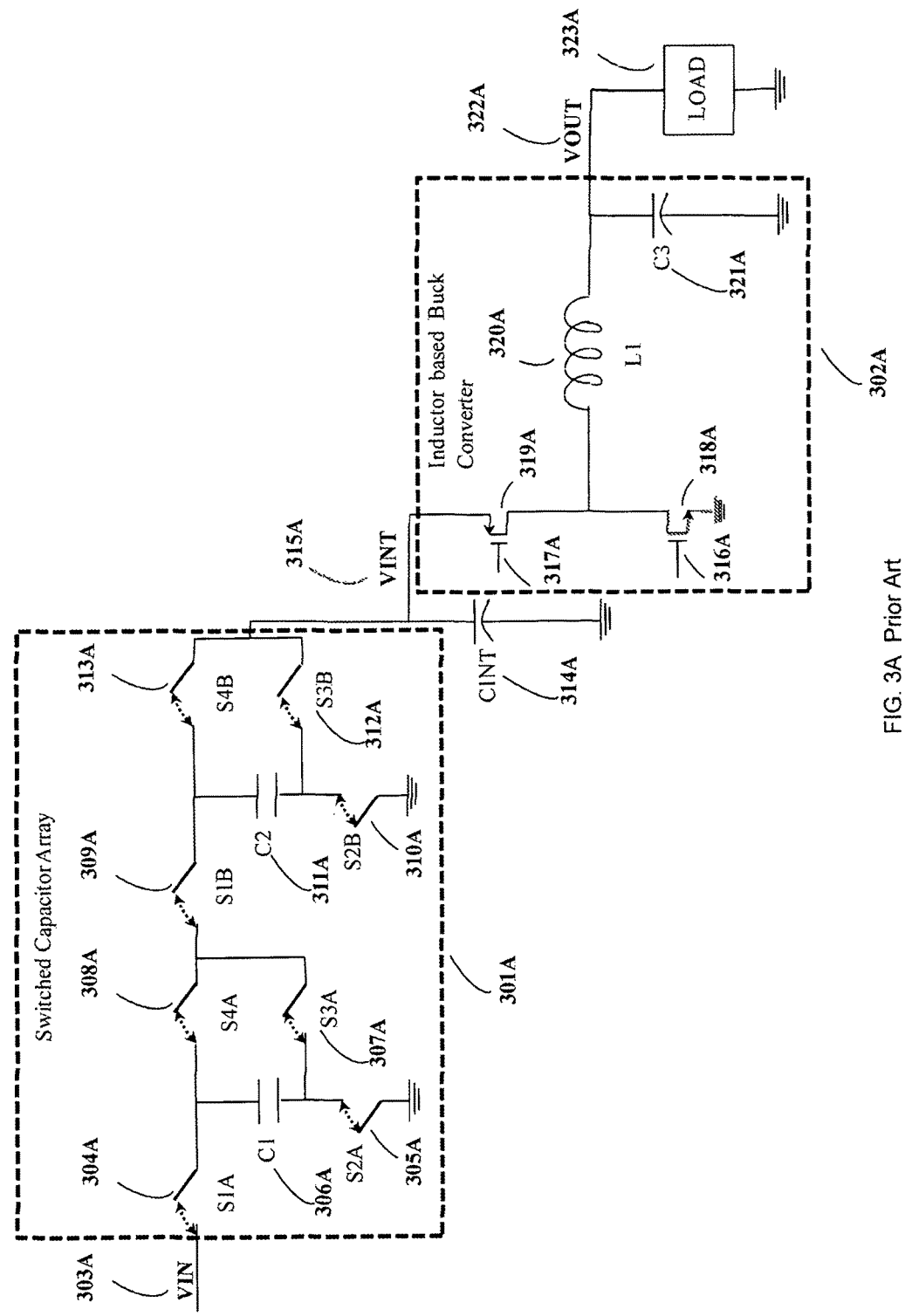
FIG. 3A illustrates a cascaded two stage step down converter.
Figure 3B:
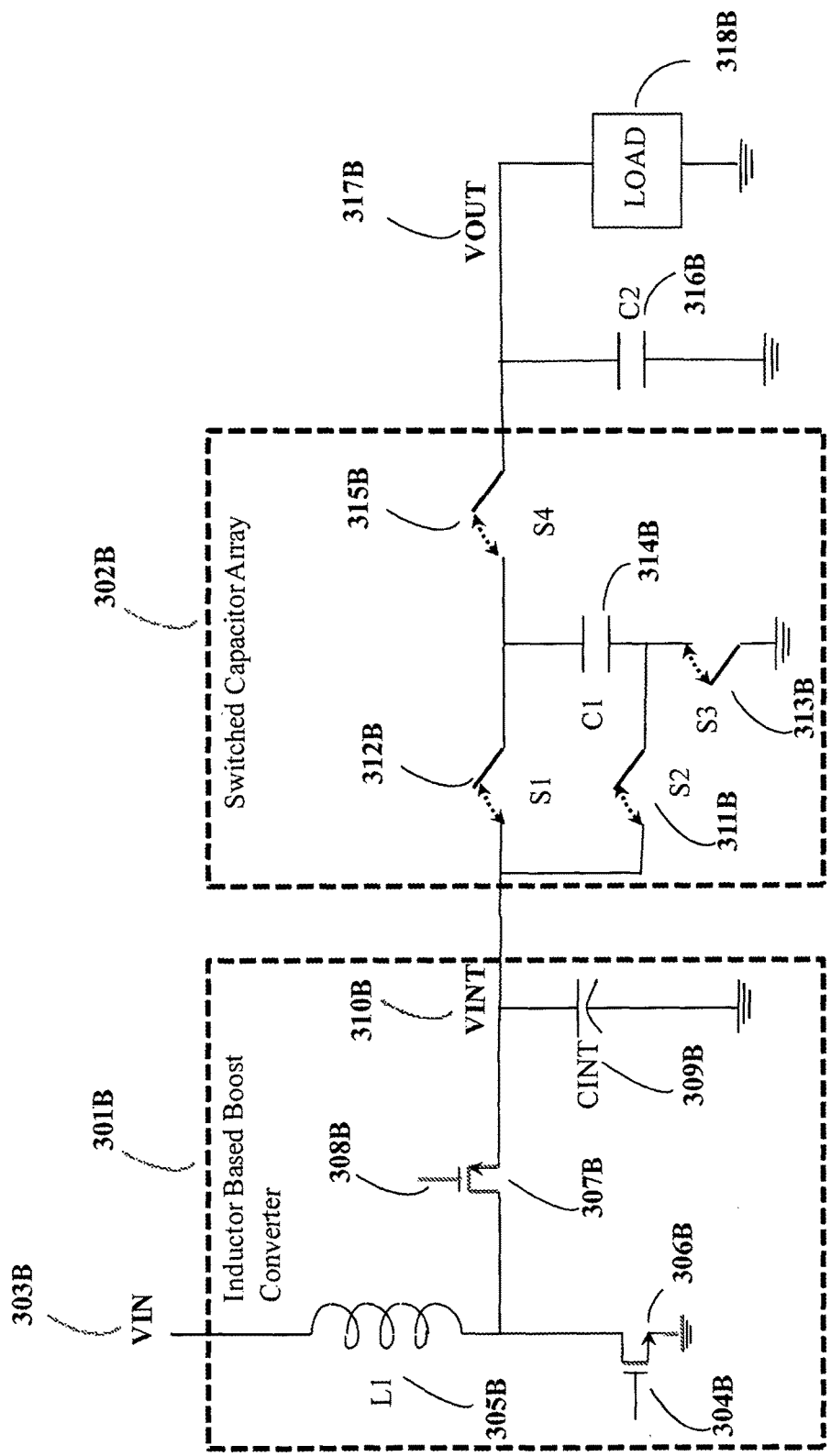
FIG. 3B illustrates a cascaded two stage step up converter.

Comparing the operation of the power supply 400 to that of a switched capacitor based two stage cascaded converter shown for example in FIG. 3A, for the converter 300A, in one phase switches S2A, S2B, S1B, S4A, S4B are closed and rest are open and this connects C1 and C2 in parallel with the capacitor CINT, thus equalizing the voltages on all the capacitors with C1 and C2 discharging and CINT charging. In the second phase, switches S1A, S3A, S1B and S3B are closed and rest are open, thus C1, C2 and CINT are in series from the input voltage VIN to ground. Since in the first phase the voltages on the three capacitors are equalized, this series connection of three capacitors from input to ground makes the voltage on each capacitor approximately ⅓ times the input voltage (ignoring switching frequency ripple). In this second phase C1 and C2 are charging and CINT is discharging by providing the load current. Since C1 and C2 are connected to the input VIN through switches, the charge current and charge duration is only limited by switch resistances (which are made small for high efficiency) thus causing an instantaneous current spike from the input voltage. In addition, since the voltage VINT on capacitor CINT is fixed at VIN/3, the stage power supply 300A needs additional switches 318A and 319A so that inductor L1 is provided with a charging voltage VINT and discharging voltage zero.

In comparison, the power supply 400 has no fixed capacitor similar to CINT connected at the output SW 416 of the switched capacitor array and provides both charging and discharging voltages as discussed above for the inductor, thus eliminating the need for CINT and additional switches. In addition, the current, when flowing, through the capacitors C1 406 and C2 413 is always equal to the inductor current (as shown in FIGS. 6A-6F). Therefore, since the inductor current is constant (ignoring small ac ripple), the voltages on the capacitors C1 and C2 can be regulated by adjusting the charge and discharge time durations (i.e. as explained above by changing Phi2 and Phi3 duty cycles). In addition, the current spike from the input VIN is limited by the inductor current when the capacitors are connected to the input thus resulting in a much smaller input current and voltage ripple. In addition unlike in the power supply 300A where capacitor C1, C2 and CINT voltages are regulated by connecting them in series and then in parallel, the voltage stored in them must always be a multiple of ⅓*VIN (as there are three capacitors), in contrast in the power supply 400, the voltages stored on the capacitors C1 and C2 can be arbitrary and can be regulated to any voltage by changing the duty cycles of Phi2 and Phi3 as the current flowing through them is limited by the inductor current. In the example above, they are chosen to be ⅔*VIN on C1 and ⅓*VIN on C2 as this combination of voltages for this switched capacitor array gives a voltage at SW 416 which is similar in each of the three phases (however the invention is not so limited).

Comparing the operation of the power supply 400 of FIG. 4 to that of a standard inductor based buck converter (example, FIG. 1A), in a standard buck converter, the inductor current ramps up and down only once per clock cycle. Furthermore ramp up voltage is equal to the difference of the input voltage VIN and output voltage VOUT. Whereas in the power supply of 400, the inductor is ramped up and down three times in a clock cycle symmetrically effectively increasing switching frequency by three times. In addition, in the power supply of 400, as explained above, the voltage at SW 416 is VIN/3 when charging the inductor. Since the inductor is ramping up with one third the voltage, the peak inductor ripple is approximately one-third that of a standard buck converter. Therefore as a combination of one-third voltage swing at SW and three times effective frequency, the inductor current ripple is about nine times smaller and thus causing the output voltage ripple to be similarly much smaller. Thus, for a given inductor current ripple requirement, the inductor value (and hence its size) can be made smaller by nine times compared to that of a standard buck converter.

FIGS. 6A through 6F describe the operation of the power supply 400 of FIG. 4 when the output voltage VOUT is less than the input voltage divided by three i.e. less than VIN/3. In this case there is no overlap of ON times (high states) of signals Phi1, Phi2, and Phi3. However, the power supply 400 can operate irrespective of the difference between VIN and VOUT voltages. FIGS. 7A through 7F show the operation of the power supply when VIN/3<VOUT<⅔VIN i.e. required voltage at the output VOUT is higher than ⅓*VIN but less than ⅔*VIN.

As apparent to one skilled in the related art, when the output is between ⅓ and ⅔ of the input, the duty cycle for a buck converter in steady state continuous conduction mode is between ⅓ and ⅔. FIGS. 7A through 7F show the duty cycle waveforms Phi1, Phi2, and Phi3 in this state. The high time of Phi1, Phi2, and Phi3 are greater than ⅓ times the time period T Sec but less than ⅔*T Sec. Since Phi2 is time shifted by ⅓*T from Phi1, and since Phi1's high time is greater than ⅓*T, the high time of Phi1 and Phi2 overlap. Similarly, since Phi3 is time shifted by ⅔*T from Phi1 and ⅓*T from Phi2, Phi2 and Phi3 overlap when Phi3 goes high and Phi1 and Phi3 overlap when Phi1 goes high. Because the duty cycle is less than ⅔ in this case, there is no simultaneous overlap of the high states of the three signals Phi1, Phi2, and Phi3 in this case. Similarly, since the duty cycle is greater than ⅓, there is no time interval during which all the signals are simultaneously low and at least one signal is high at any given time.

Figure 7A:
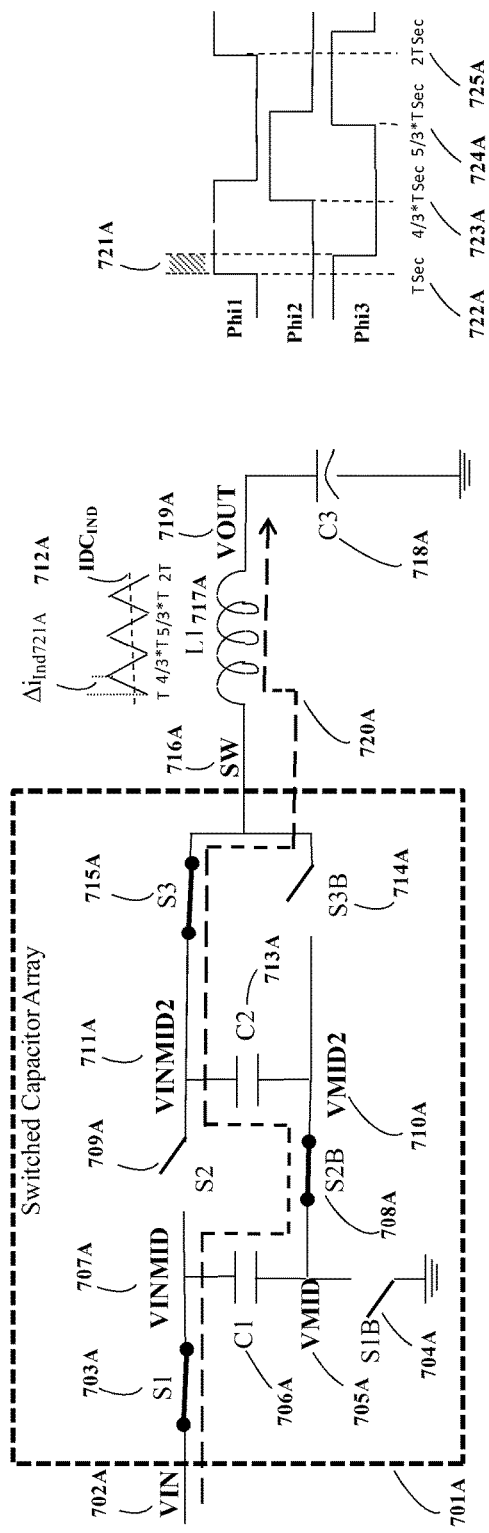

FIG. 7A shows the operation of the power supply 400 when the high states of Phi1 and Phi3 overlap 721A. Since Phi1 and Phi3 are high, switches S1 703A, and S3 715A are closed, and S1B 704A, and S3B 714A are open. Since Phi2 is low, switch S2B 708A is closed and switch S2 709A is open. This is shown in switched capacitor array 701A.

The dashed line 720A represents the current flow in this state. In this state, the current through the inductor L1 717A is flowing from input source at VIN 702A through the closed switch S1 703A, capacitor C1 706A, closed switch S2B 708A, capacitor C2 713A and switch S3 715A to the output VOUT 719A. As described above, since C1 is charged to a voltage equal to ⅔*VIN and C2 is charged to ⅓*VIN, the voltage at SW node 716A in this state is approximately equal to (VIN−voltage across capacitor C1+voltage across capacitor C2) i.e. (VIN−⅔*VIN+⅓VIN)=⅔*VIN (ignoring the voltage drop across the closed switches S1 703A, S2B 708A, and S3 715A which are sized to minimize the drop across them). Thus the voltage across the inductor L1 717A is (⅔*VIN−VOUT). Since, in this case, ⅔*VIN is higher than VOUT, inductor L1 717A current will be ramping up in value around its DC value $IDC_{IND}$ by $\Delta i_{Ind721A}$ as shown at 712A and the net increase in charge delivered to VOUT 719A during this time being equal to $\Delta i_{Ind721A}*T_{721A}$, where $\Delta i_{Ind721A}$ is the net change in inductor current during the time 721A and $T_{721A}$ is equal to the time shown at 721A (i.e. during the time when Phi1 and Phi3 are high). In addition, since the same is current flowing through the capacitors C1 706A, C2 713A through the inductor L1 717A and to the output VOUT 719A in this state, the net increase in charge stored in the capacitor C1 706A (as current is flowing into it) and the net decrease in the charge stored in capacitor C2 713A (as current is flowing out of it) around their DC steady state value is equal to the $IDC_{IND}*T_{721A}$ where $IDC_{IND}$ is the average inductor current as shown at 712A. Node VINMID 707A is connected to capacitor C1 706A as shown. Node VMID 705A is connected to capacitor C1 706A as shown. Node VMID2 710A is connected to capacitor C2 713A as shown. Node VINMID2 711A is connected to capacitor C2 713A as shown. VOUT 719A is connected to capacitor C3 718A. 722A, 723A, 724A, and 725A respectively indicate time T Sec, 4/3*T Sec, 5/3*T Sec, and 2T Sec.

Figure 7B:
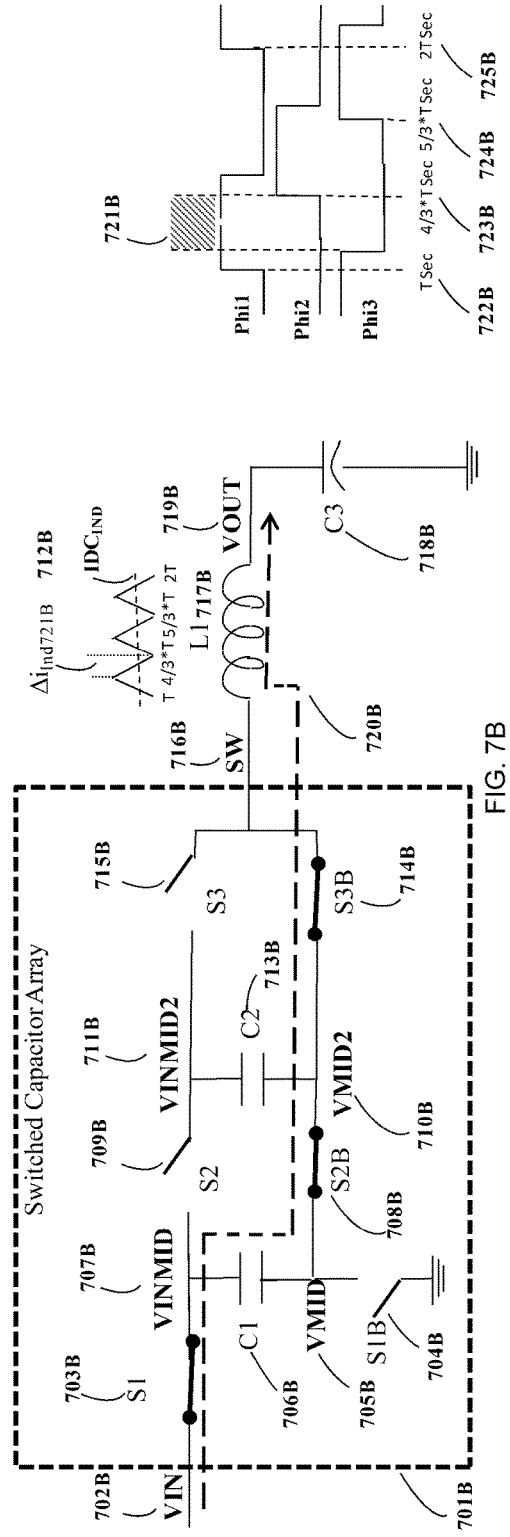

FIG. 7B shows the state of the power supply 400 during the time period 721B where Phi1 is high and Phi2 and Phi3 are low. The state of the switched capacitor array 710B in this time interval 721B is same as that described above for time interval 621A in FIG. 6A. The inductor L1 717B current path in this state is shown by the dashed line 720B. As described in the operation of FIG. 6A above, the voltage at the SW node 716B is VIN/3 and C1 706B is charging in this condition and there is no current flow from or into capacitor C2 713B and its charge is held constant. However unlike in FIG. 6A where VOUT is less than ⅓VIN and thus a voltage of ⅓*VIN at SW node increases inductor current during the time period 621A, since in this case output voltage VOUT 719B is greater than ⅓*VIN, the voltage across the inductor L1 717B (⅓*VIN−VOUT) is negative and therefore inductor current is ramping down in this time period 721B and the change in inductor current is $\Delta i_{Ind721B}$ as shown at 712B and the decrease in inductor current causes a net decrease in charge delivered to VOUT 719B, during this time, equal to $\Delta i_{Ind721B}*T_{721B}$, where $T_{721B}$ is equal to the time shown in 721B.

Since in steady state the output voltage VOUT is regulated by the control loop, and in addition, as discussed above in the control loop operation in reference to FIG. 5 since Phi1, Phi2 and Phi3 signals are symmetrical and just shifted in time, Phi2 and Phi3 time intervals in the rest of the clock period, 721C, 721D, 721E and 721F (in FIGS. 7C, 7D, 7E and 7F respectively) will be symmetrical to the time intervals 721A and 721B in FIGS. 7A and 7B. Therefore the net increase in inductor current $\Delta i_{Ind721A}$ during time interval 721A must be equal to net decrease in Inductor current $\Delta i_{Ind721B}$ during time interval 721B. As an example, if the net increase in inductor current is higher than the net decrease, then the inductor current will keep on increasing from its DC value, causing output voltage VOUT to go out of regulation. This will make the control loop respond (as explained above in reference to FIG. 5) and decrease the time interval (duty cycle of Phi1) 721A with respect 721B such that there is no net change in Inductor current $\Delta i_{Ind721A}$ equals $\Delta i_{Ind721B}$ and in addition making the net increase in charge delivered to output during time interval 721A must equal net decrease in charge delivered to output during the interval 721B i.e. $\Delta i_{Ind721A}T_{721A}$ is equal to $\Delta i_{Ind721B}*T_{721B}$ such that output VOUT stays in regulation.

Thus during the time interval 721A and 721B, the inductor current has increased and decreased by the same amounts around its DC value and this inductor ripple current causes a ripple in the output voltage VOUT without changing its DC value. Also, during these time intervals, the net charge in capacitor C1 is increased by $(IDC_{IND}*T_{721A} + IDC_{IND}*T_{721B})$, whereas net charge in capacitor C2 is decreased by $IDC_{IND}*T_{721A}$.

VIN 708 enters switched capacitor array 701B. Switches S1 703B, S2B 708B, and S3B 714B are closed, and switches S1B 704B, S2 709B, and S3 715B are open. Node VINMID 707B is connected to capacitor C1 706B as shown. Node VMID 705B is connected to capacitor C1 706B as shown. Node VINMID2 711B is connected to capacitor C2 713B as shown. Node VMID2 710B is connected to capacitor C2 713B as shown. VOUT 719B is connected to capacitor C3 718B. 722B, 723B, 724B, and 725B respectively indicate time T Sec, 4/3*T Sec, 5/3*T Sec, and 2T Sec.

Figure 7C:
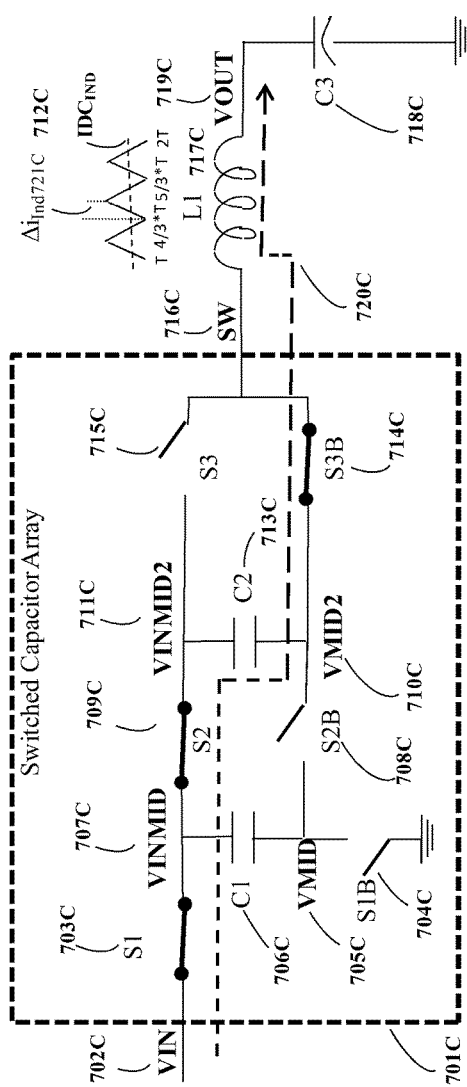

FIG. 7C shows the state of power supply 400 during the time interval 721C when Phi1 and Phi2 are high and Phi3 is low. Since Phi1, and Phi2 are high switches S1 703C and S2 709C are closed, and switches S1B 704C and S2B 708C are open, and since Phi3 is low, switch S3B 714C is closed and switch S3 715C is open as shown in Switched Capacitor Array 701C. This causes the inductor L1 717C current to flow from the closed switches S1 703C, S2 709C, through capacitor C2 713C through closed switch S3B 714C to the output VOUT 719C as shown by the dashed line 720C. Since capacitor C2 713C (which is charged to ⅓*VIN) is connected between VIN 702C and SW node 716C, the voltage at SW node 716C during this time interval 721C will be equal to (VIN−⅓*VIN) i.e. ⅔VIN. Thus again, during the time interval 721C, the voltage across the inductor L1 717C is (⅔*VIN−VOUT) which is same as that during time interval 721A. Thus, even though the switch capacitor configuration is different, the inductor and output behavior during the time interval 721C is symmetrical to that of 721A increasing the inductor current by $\Delta i_{Ind721C}$ as shown at 712C. Since in steady state, when the voltage on capacitors C1 706C and C2 713C are in regulation, because of the symmetry in Phi1, Phi2 and Phi3 signals, the time duration 721C will be approximately equal to the time duration 721A. Since the voltage across the inductor L1 717C during the time 721A and 721C is the same and since also the time durations 721A and 721C are equal, the increase in inductor current $\Delta i_{Ind721C}$ as shown at 712C during the time 721C is equal to the increase in inductor current $\Delta i_{Ind721A}$ during the time interval 721A.

During the time interval 721C, capacitor C2 713C is charging as current is flowing in to it (as shown by dashed line 720C) and the charge on capacitor C1 706C is constant. Since the same current is flowing through capacitor C2 713C and inductor L1 717C, the net increase in the charge of C2 713C is equal to the average inductor L1 717C current during this time multiplied by the time duration. Thus the increase in charge of C2 713C is equal to $IDC_{IND}*T_{721C}$ where $T_{721C}$ is the time duration 721C.

Node VINMID 707C is connected to capacitor C1 706C as shown. Node VMID 705C is connected to capacitor C1 706C as shown. Node VINMID2 711C is connected to capacitor C2 713C as shown. Node VMID2 710C is connected to capacitor C2 713C as shown. VOUT 719C is connected to capacitor C3 718C. 722C, 723C, 724C, and 725C respectively indicate time T Sec, 4/3*T Sec, 5/3*T Sec, and 2T Sec.

Figure 7D:
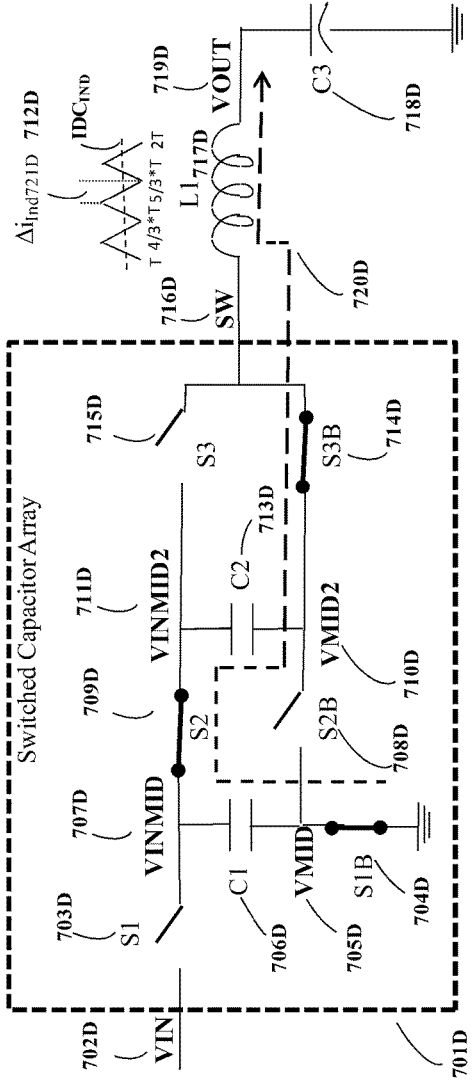

FIG. 7D shows the state of the power supply 400 during the time period 721D where Phi2 is high, and Phi1 and Phi3 are low. The state of the switched capacitor array 701D in this time interval 721D is the same as that described above for time interval 621C in FIG. 6C. The inductor L1 717D current path in this state is shown by the dashed line 720D. As described in the operation of FIG. 6C above, the voltage at the SW node 716D is VIN/3 and C1 706D is discharging in this state and capacitor C2 713D is charging. However unlike in FIG. 6C where VOUT is less than ⅓VIN and thus a voltage of ⅓*VIN at SW node increases inductor current during the time period 621C, since in this case the output voltage VOUT 719D is greater than ⅓*VIN, the voltage across the inductor L1 717D, being equal to (⅓*VIN−VOUT), is negative and therefore the inductor current is ramping down in this time period 721D and is shown by $\Delta i_{Ind721D}$ at 712D and the decrease in inductor current causes a net decrease in charge delivered to VOUT 719D during this time equal to $\Delta i_{Ind721D}*T_{721D}$, where $T_{721D}$ is equal to the time shown in 721D As explained above for the time intervals 721A and 721B, there is no net increase in inductor current and charge delivered to the output VOUT, in steady state operation, during the time intervals 721C and 721D i.e. $\Delta i_{Ind721C}*T_{721C}$ is equal to $\Delta i_{Ind721D}*T_{721D}$.

As the current flowing out of the capacitor C1706D during the time interval 721D is equal to the current flowing into the capacitor C2 713D, which in turn is equal to the inductor L1 717D current, the capacitor C1 706D is discharged (and C2 713D is charged) by $IDC_{IND}*T_{721D}$, where $IDC_{IND}$ is the average inductor current during the time interval 721D and $T_{721D}$ is the time interval shown by 721D.

Thus during the time periods 721A through 721D, the net increase in capacitor C1 charge is $IDC_{IND}*(T_{721A}+T_{721B}-T_{721D})$ and net increase in C2 charge is $IDC_{IND}*(T_{721C}+T_{721D}-T_{721A})$.

As shown in FIG. 7D, VIN 702D is presented to switched capacitor array 701D. In switched capacitor array 701D S1 703D is open, switch S1B 704D is closed, switch S2 709D is closed, switch S2B 708D is open, switch S3 715D is open, and switch S3B 714D is closed as shown. Node VINMID 707D is connected to capacitor C1 706D as shown. Node VMID 705D is connected to capacitor C1 706D as shown. Node VINMID2 711D is connected to capacitor C2 713D as shown. Node VMID2 710D is connected to capacitor C2 713D as shown. VOUT 719D is connected to capacitor C3 718D as shown. 722D, 723D, 724D, and 725D respectively indicate time T Sec, 4/3*T Sec, 5/3*T Sec, and 2T Sec.

FIG. 7E shows the state of power supply 400 during the time interval 721E when Phi2 and Phi3 are high thus switches S2 709E and S3 715E are closed and S2B 708E and S3B 714E are open and Phi1 is low thus S1B 704E is closed and S1 703E is open as shown in switched capacitor array 701E. This switch arrangement causes the inductor L1 717E current to flow from the closed switch S1B 704E, out of capacitor C1 706E, through the closed switches S2 709E and S3 715E to the output VOUT 719E as shown by the dashed line 720E. Since node VMID 705E is pulled to ground by the closed switch S1B 704E, the voltage at node VINMID 707E will be equal to the voltage stored on capacitor C1 706E which is equal to ⅔*VIN (ignoring small ac ripple component). Since node VINMID 707E is connected to SW node 716E through closed switches S2 709E and S3 715E, the voltage at SW node 716E during this time interval 721E will be equal to ⅔*VIN. Thus again, during the time interval 721E, the voltage across the inductor L1 717E is (⅔*VIN−VOUT) which is same as that during time intervals 721A and 721C. Thus, even though the switch capacitor configuration is different, the inductor and output behavior during the time interval 721E is similar to that of 721A and 721C, increasing the inductor current by $\Delta i_{Ind721E}$ as shown at 712E. In steady state, because of the symmetry of the Phi1, Phi2 and Phi3 signals as explained above, the time duration 721E will be approximately equal to the time durations 721A and 721C. Since the voltage across the inductor L1 during the time 721A (721C) and 721E is the same and in addition since the time durations 721A (721C) and 721E are equal, the increase in inductor current $\Delta i_{Ind721E}$ during the time 721E is equal to the increase in inductor current $\Delta i_{Ind721A}$ ($\Delta i_{Ind721C}$) during the time interval 721A (721C).

During the time interval 721E, capacitor C1 706E is discharging as current is flowing out of it (as shown by dashed line 720E). Since the same current is flowing through capacitor C1 706E and Inductor L1 717E, the net decrease in the charge of C1 706E is equal to $IDC_{IND}*T_{721E}$ where $IDC_{IND}$ is the inductor average current during this time and $T_{721E}$ is the time duration 721E. Since there is no path for current to flow through capacitor C2 713E, its voltage remains unchanged during this time interval 721E.

As shown in FIG. 7E, VIN 702E is presented to switched capacitor array 701E. Node VINMID2 711E is connected to capacitor C2 713E as shown. Node VMID2 710E is connected to capacitor C2 713E as shown. VOUT 719E is connected to capacitor C3 718E as shown. 722E, 723E, 724E, and 725E respectively indicate time T Sec, 4/3*T Sec, 5/3*T Sec, and 2T Sec.

FIG. 7F shows the state of the power supply 400 during the time period 721F where Ph3 is high, and Phi1 and Phi2 are low. The state of the switched capacitor array 701F in this time interval 721F is the same as that described above for time interval 621E in FIG. 6E. The inductor L1 717F current path in this state is shown by the dashed line 720F. As described in the operation of FIG. 6E above, the voltage at the SW node 716F is VIN/3 and C2 713F is discharging in this state and capacitor C1 706F is open. However unlike in FIG. 6E where VOUT is less than ⅓VIN and thus a voltage of ⅓*VIN at SW node increases inductor current during the time period 621E, since in this case output voltage VOUT 719F is greater than ⅓*VIN, the voltage across the inductor L1 717F being (⅓*VIN−VOUT) is negative and therefore inductor current is ramping down in this time period 721F and is $\Delta i_{Ind721F}$ as shown at 712F and the decrease in inductor current causes a net decrease in charge delivered to VOUT 719F during this time equal to $\Delta i_{Ind721F} * T_{721F}$, where $T_{721F}$ is equal to the time shown in 721F.

As shown in FIG. 7F, VIN 702F is presented to switched capacitor array 701F.

In switched capacitor array 701F S1 703F is open, switch S1B 704F is closed, switch S2 709F is open, switch S2B 708F is closed, switch S3 715F is closed, and switch S3B 714F is open as shown. Node VINMID 707F is connected to capacitor C1 706F as shown. Node VMID 705F is connected to capacitor C1 706F as shown. Node VINMID2 711F is connected to capacitor C2 713F as shown. Node VMID2 710F is connected to capacitor C2 713F as shown. VOUT 719F is connected to capacitor C3 718F as shown. 722F, 723F, 724F, and 725F respectively indicate time T Sec, 4/3*T Sec, 5/3*T Sec, and 2T Sec.

As explained above for the time intervals 721A and 721B, there is no net increase in inductor current and charge delivered to the output VOUT, in steady state operation, during the time intervals 721E and 721F (i.e. $\Delta i_{Ind721E} * T_{721E}$) is equal to $\Delta i_{Ind721F} * T_{721F}$.

Since the amount of current flowing out of the capacitor C2 713F in this state is the same as the current flowing through the inductor L1 717F, the amount of charge discharged through C2 713F during this time interval 721F is equal to the average inductor current multiplied by the time duration i.e. equal to $IDC_{IND} * T_{721F}$. Since C1 706F is open during this time, there is no change in C1 706F charge.

Adding the net charge from the time periods 721E and 721F to the accumulated charges from time intervals 721A through 721D, the net increase in capacitor C1 charge is $IDC_{IND} * (T_{721A} + T_{721B} - T_{721D} - T_{721E})$ and net increase in C2 charge is $IDC_{IND} * (T_{721C} + T_{721D} - T_{721A} - T_{721F})$. Because of the symmetry in Phi1, Phi2 and Phi3, in steady state when the voltages on C1 and C2 are in regulation, time duration $T_{721A}$ equals $T_{721C}$ which in turn equals $T_{721E}$ and time duration $T_{721B}$ equals $T_{721D}$ which in turn equals $T_{721F}$. This causes the net change in capacitor charges C1 and C2 in one clock cycle from time interval 721A through 721F to be zero. This operation is repeated in steady state for every cycle.

FIGS. 7A through 7F describe the operation of the power supply 400 of FIG. 4 when the output voltage VOUT is higher than ⅓ of the input voltage but less than ⅔*VIN. Even though VOUT is higher than ⅓*VIN in this case, as described above the inductor charging voltage produced by the switched capacitor array at its output node SW is ⅔*VIN in each of the three phases and inductor discharge voltage is ⅓*VIN. Thus the differential between charging and discharging voltage is (⅔*VIN−⅓*VIN) i.e. equal to ⅓*VIN which is exactly the same as that during the operation of the power supply 400 when VOUT is less than ⅓*VIN (as described in the operation of FIGS. 6A through 6F, where SW node is ⅓*VIN while charging inductor and equal to zero while discharging). Comparing the operation of the power supply 400 of FIG. 4 to that of a standard inductor based buck converter (example, FIG. 1A), in a standard buck converter, the inductor current ramps up and down only once per clock cycle as compared to three times in the power supply 400 of FIG. 4. Furthermore inductor ramp up voltage at SW node 119 (in FIG. 1A) is equal to the input voltage VIN and the inductor discharge voltage at SW node 119 is equal to zero, the difference between these voltages being equal to the input voltage VIN. Thus the power supply 400 of FIG. 4, even in the case where the output voltage is higher than ⅓*VIN, still presents the inductor charge discharge voltage differential which is ⅓ that of a standard buck converter thus effectively reducing inductor current ripple by ⅓ and in addition because of the time shifted three phase operation of the switched capacitor array, the inductor is charged, discharged three times symmetrically in a clock cycle effectively increasing switching frequency by three times. Therefore as a combination of one-third inductor voltage swing and three times effective frequency, the inductor current ripple is about nine times smaller and thus causing output voltage ripple to be similarly much smaller. Thus, for a given inductor current ripple requirement, the inductor value (and hence its size) can be made smaller by nine times compared to that of a standard buck converter.

FIGS. 6A-6F and FIGS. 7A-7F describe the operation of the power supply 400 of FIG. 4 when the output voltage VOUT is less than ⅓*VIN and when ⅓*VIN<VOUT<⅔*VIN respectively. The operation is similar even when the output voltage VOUT is greater than ⅔*VIN. As apparent to one skilled in the related art, the duty cycle in the steady state and continuous conduction mode for a buck regulator when output is greater than ⅔*VIN is greater than ⅔. Therefore, the control loop for example as shown in FIG. 5, makes the ON times (duty cycles) of the control signals Phi1, Phi2, and Phi3 to be greater than ⅔*T Sec, where T is the time period of one switching cycle. Since Phi 1, Phi2 and Phi3 are time shifted from each other by ⅓*T Sec and since the high times of each of these signals are more than ⅔*T sec, Phi1, Phi2, and Phi3 will all be high for some duration together, and two of the three signals will be high (Phi, Phi3 together as in FIG. 7A, Phi1, Phi2 together as in FIG. 7C and Phi1, Phi3 together as in FIG. 7E) for rest of the clock cycle. Only one signal cannot be high in this case when each high time is greater than ⅔*T Sec. Similarly all the signals cannot be low at the same time in this case.

When all the signals Phi1, Phi2, and Phi3 are high together, the switches S1 403, S2 409, and S3 415 in FIG. 4 will be closed and their complimentary switches S1B 404, S2B 408, and S3B 414 will be open. Since S1 403, S2 409, and S3 415 are closed, the voltage at SW node 416 will be equal to the voltage at VIN 402 as VIN 402 will be connected to SW node 416 in this condition. Thus inductor L1 417 will be charging with a voltage equal to the differential (VIN−VOUT) during this time interval. The operation when two of the three control signals Phi1, Phi2, and Phi3 are high together is discussed above with reference to FIGS. 7A, 7C, and 7E. As discussed above, in each of these time intervals, the voltage at SW node is ⅔*VIN. Since VOUT in this case is greater than ⅔*VIN, the voltage at the SW node will discharge the inductor with a voltage differential equal to (VOUT−⅔*VIN). Thus in this condition the voltage at SW node will be VIN followed by ⅔*VIN, which is repeated three times (Phi1, Phi2, Ph3 high together followed by Phi1, Phi2 high, again all three high followed by Phi2, Phi3 high, again all three high followed by Phi1, Phi3 high) symmetrically during each clock period. Therefore again in this case when VOUT is higher than ⅔*VIN, the differential between the inductor charging voltage at SW node (equal to VIN) and the inductor discharge voltage at SW node (equal to ⅔*VIN) is ⅓*VIN which is ⅓ that of a standard buck converter as discussed above. Combined with this reduced one-third voltage, since the inductor is charged and discharged three times in a clock cycle, the inductor current ripple is nine times smaller than that of a standard buck converter.

Again comparing the operation of power supply 400 to that of a cascaded two stage power supply, for example, as shown in FIG. 3A, for the power supply 300A, when the output voltage at VOUT 322A is greater than ⅔*VIN, the intermediate voltage VINT 315A must be higher than ⅔*VIN (as the second stage 302A is a buck converter). Thus, the switched capacitor stage closes switches S1A 304A, S4A 308A, S2A 305A, and S4B 313A thus making VINT 315A equal to VIN 303A. Therefore, when VINT 315A is equal to VIN 303A, the voltage swing at the inductor L1 320A will be VIN 303A, the same as that of a standard buck converter (and again is three times higher than that of the power supply 400) thus offering no advantages compared to that of a single stage standard buck converter.

FIG. 8 summarizes, generally at 800, the operation of the power supply 400 of FIG. 4 for all the possible combinations of the control signals Phi1, Phi2, and Phi3 (thus for all possible input and output voltage combinations) as discussed above. Irrespective of the input and output voltage ratios, this power supply produces three symmetrical phases in each clock cycle wherein the inductor is charged and discharged symmetrical in each of these phases with a much reduced voltage differential between the charge and discharge voltages at SW node (⅓*VIN in this example).

Thus the power supply 400 generates an inductor charging voltage equal to VIN/3 (only one control signal of the three Phi1, Phi2, and Phi3 being high in this case) and inductor discharge voltage of Zero (no control signals being high) when VOUT is less than ⅓*VIN. Similarly, it generates an Inductor charging voltage equal to 2VIN/3 (two of three signals being high in this case) and discharge voltage of VIN/3 (again only one of three signals being high in this case) when VOUT is higher than VIN/3 but less than ⅔VIN. Similarly it generates an inductor charging voltage equal to VIN (all control signals being high during this time) and an Inductor discharge voltage being equal to ⅔VIN (only two of the three control signals being high) when VOUT is greater than ⅔*VIN. In addition, this charging and discharging of the inductor is repeated three times in a clock cycle by time shifting the control signals from the previous signal by a time duration equal to ⅓ time one clock period.

The above method according to one embodiment of the invention can be generalized to N voltage levels at the inductor. The method involves generating a charging voltage at an inductor equal to X/N*VIN and a discharge voltage at the inductor equal to (X−1)/N*VIN when VOUT is less than X/N*VIN but higher than (X−1)/N*VIN, wherein X and N are any whole numbers, with X being less than equal to N (e.g. X<=N). In addition, if N control signals are used to generate these charge and discharge voltages, with each control signal representing a duty cycle of the converter but shifted in time from the previous signal by 1/N times one clock period, then the inductor charge and discharge voltages could be automatically generated by the number of these control signals being high at any given time i.e. presenting the inductor with a voltage equal to K/N*VIN at any time when K of the N signals are high (K being an integer). Thus applying the equation K/N*VIN to the power supply 400 with three control signals Phi1, Phi2, and Phi3, i.e. N=3, when K=0, (i.e. when Phi1, Phi2, and Phi3 are all low), the voltage at the inductor (at SW node 416) should be zero, and when K=1 (i.e. when only one signal is high), the voltage at the inductor is ⅓*VIN. Similarly it could be applied for other cases, each generating a voltage which matches the voltages described above with reference to the power supply of 400 and as summarized in FIG. 10.

As discussed above, irrespective of the input and output voltages, the power supply 400 generates an inductor current ripple which is 9 times smaller than that of a standard buck converter operating at same switching frequency. In addition, since the output voltage ripple is proportional to $\Delta i_{Ind}$/fs, where $\Delta i_{Ind}$ is the inductor current ripple and is fs is the effective switching frequency, the output ripple for the power supply 400 of FIG. 4 is ⅑*⅓=1/27 i.e. 27 times smaller (as the inductor current ripple is 9× smaller and the effective frequency is 3× because of the three phase operation) than that of a standard buck converter. Thus, for a given output voltage ripple requirement, the reduction in the product of inductor and capacitor values is 27 times. As an example the inductor can be made 9 times smaller and the output capacitor 3 times smaller for the same output voltage ripple as that of the standard buck converter. Thus, the power supply 400 of FIG. 4 greatly reduces the size of the discrete components and produces very small switching ripple thus greatly reducing electromagnetic interference (EMI).

Further advantage of the power supply 400 of FIG. 4 is that switches of the switched capacitor array 401 can be lower voltage devices compared to that of a standard buck converter. For a standard buck converter (example, FIG. 1A), the SW node 119 swings between input voltage VIN 103 when the pull up device 105 is turned on and it's pulled to ground when the pull down device 104 turns on. Because the SW node 119 voltage swing is equal the input voltage VIN 103, both the devices 104 and 105 must be rated for maximum input voltage at VIN 103. On the other hand, for the devices in the switched capacitor array 401 of FIG. 4, if the voltage at the SW node 416 is zero, since the capacitor C1 406 is charged to ⅔*VIN, the voltage at node VINMID 407 is ⅔*VIN and since the capacitor C2 413 is charged to ⅓*VIN, the voltage at node VINMID2 411 is ⅓*VIN. Thus the voltage differential across the device S1 403 is (VIN−⅔*VIN)=⅓*VIN, across S2 409 is (⅔*VIN−⅓*VIN)=⅓*VIN and across S3 415 is (⅓*VIN−0)=⅓*VIN. Similarly, when the SW node 416 is pulled up to VIN 402, the voltage at node VMID 405 (as the capacitor C1 406 is charged to ⅔*VIN) and hence across S1B 404 is (VIN−⅔*VIN)=⅓*VIN and the voltage at node VMID2 410 (as C1 406 is charged to ⅓*VIN) is (VIN−⅓*VIN)=⅔VIN. Therefore voltage across S2B 408 is (VMID2−VMID) and is (⅔*VIN−⅓*VIN)=⅓*VIN and voltage across S3B 414 is (SW−VMID2) and is (VIN−⅔*VIN)=⅓*VIN. Thus all the devices (switches) S1 403, S2 409, S3 415, S1B 404, S2B 408, and S3B 414 see a voltage which is only ⅓ of the voltage at VIN 402 for any configuration of the switches. Therefore, these devices can be rated for only $\frac{1}{3}^{rd}$ voltage that of a stand buck converter. This not only makes the power supply 400 of FIG. 4 smaller but also more efficient.

As apparent to one skilled in related art, the efficiency of a switching power supply is dependent mostly on the conduction and switching losses of the power devices. Conduction losses depend on the resistance of the device. As an example for a CMOS device used as the switch, the ON resistance is inversely proportional to (VGS−Vth)*W/L*1/Th, where VGS is the gate to source voltage, Vth is the threshold voltage, W is the width of the device, L is the channel length and Th is the gate oxide thickness. As the device voltage rating is reduced, smaller geometry devices can be used. If the voltage rating of the device is reduced by $\frac{1}{3}^{rd}$ (and hence VGS by $\frac{1}{3}^{rd}$), then the channel length and oxide thickness can both be reduced by $\frac{1}{3}^{rd}$, therefore for a device rated for $\frac{1}{3}^{rd}$ the voltage, the ON resistance for the same width is approximately reduced by $\frac{1}{3}^{rd}$ compared to that of a regular device (as [(VGS−VTh)*W/L*1/Th] is approximately $(\frac{1}{3})*3*3=3$ times and ON resistance is inversely proportional to this).

Figures 1A, 1B:
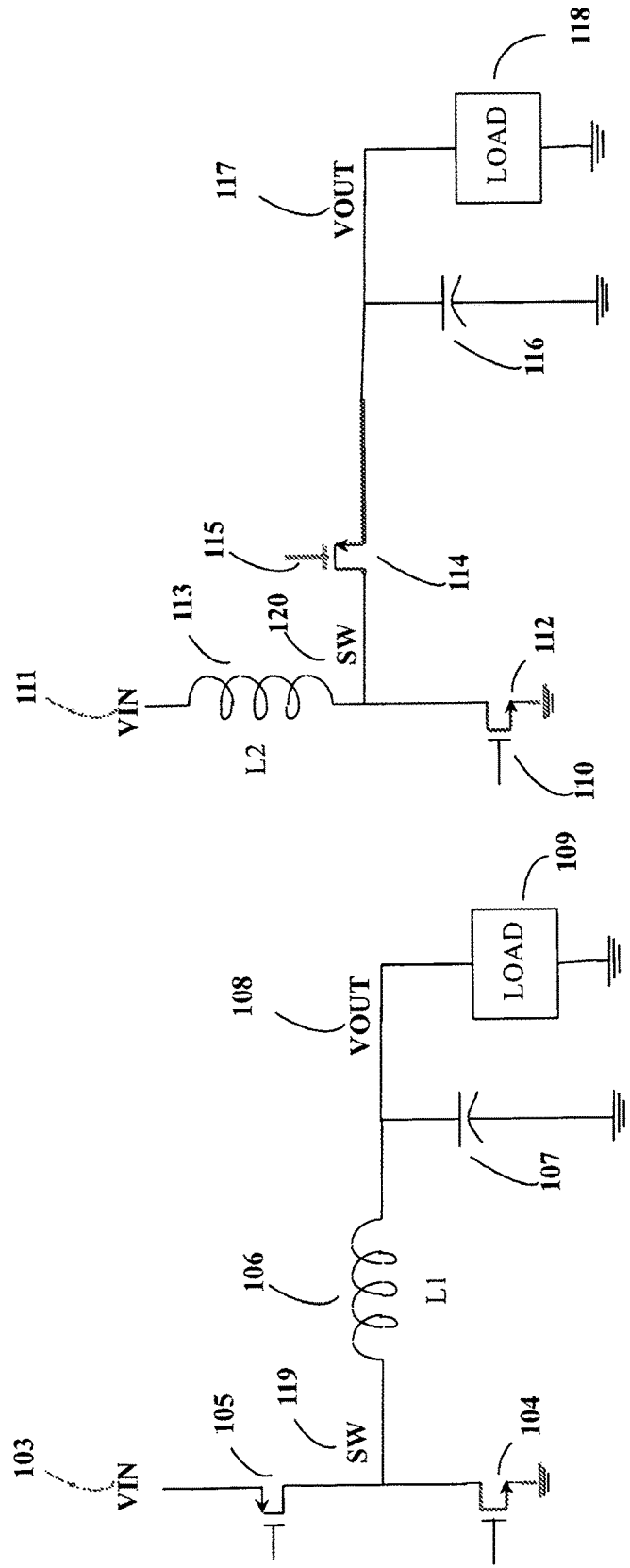
FIG. 1A illustrates inductor based buck converter.
FIG. 1B illustrates inductor based boost converter.

Therefore in the switched capacitor array 401 of FIG. 4, although there are three switches S1, S2, and S3 in series between VIN 402 and SW 416 and since these switches can be rated for only $\frac{1}{3}$*VIN, using the same width for these devices as that a single device rated at VIN, the total resistance between VIN and SW for this switch capacitor array is 3 times (as three devices in series)*$\frac{1}{3}$ (as the resistance of each one is only $\frac{1}{3}^{rd}$)=1 and is the same as that of devices in a standard buck converter (example FIG. 1A). Thus, using three switches in series for this power supply doesn't decrease the efficiency of this power supply compared to that of a standard buck converter.

Similarly, the switching losses are proportional to Freq*C*$V^{2t}$ where Freq is the switching frequency, C is the capacitance and V is the voltage swing. Capacitance of a device is inversely proportional to the W (device width)*L (channel length)*1/Th (Oxide Thickness). As mentioned above, since the switches of the power supply 400 of FIG. 4 can use $\frac{1}{3}^{rd}$ voltage rating devices and hence oxide thickness is $\frac{1}{3}^{rd}$ The capacitance of the $\frac{1}{3}^{rd}$ voltage rated device using the same width but since it has $\frac{1}{3}^{rd}$ the channel length and $\frac{1}{3}^{rd}$ oxide thickness is (1*[$\frac{1}{3}$]*3=1) is hence the same as that of a device rated for full voltage. However, since the voltage swing of the power supply 400 is $\frac{1}{3}^{rd}$ that of a standard buck and if the switching frequency is the same, switching losses for the power supply 400 is [3*Freq (as there are 3× more switches than that of a standard buck converter producing 3 time shifted phases per switching cycle)*1C*$(\frac{1}{3})^2$*V], which is $\frac{1}{3}^{rd}$ that of a standard buck converter. Thus, for the power supply 400 of FIG. 4, even though there are 3 times more switches than that of a standard buck converter, since these switches can be rated for $\frac{1}{3}^{rd}$ voltage, if the switches have the same width, then the total resistance for the switched capacitor array is the same as that of a standard buck converter and the switching losses are reduced by $\frac{1}{3}^{rd}$ Thus, the power supply 400 is more efficient than a standard buck converter having the same switching frequency.

In addition as the inductor value could be made much smaller as discussed above for the power supply 400, the bandwidth and hence the transient response, as the inductor current can now be changed faster with a smaller inductor, can be improved significantly for the power supply 400 compared to that of the standard inductor based buck converter.

Thus the power supply 400 of FIG. 4 can not only use smaller output filter components (inductor and output capacitor) but also is more efficient and has a wider bandwidth than a standard inductor based buck converter. In addition, since the devices are rated for a lower voltage, the power supply can be integrated with in the same digital system to which it is supplying power.

As an example, if the input supply is a single cell Li-ion battery, whose voltage can be as high as 4.3V, as in a mobile device, typically devices rated for 5.5V are used as power devices for the power supply. Since the power supply 400 of FIG. 4 can use $\frac{1}{3}^{rd}$ the voltage rated device, this power supply can be designed using 1.8V devices. If this power supply is powering a CPU (Central Processor Unit) (which is manufactured using an advanced nano meter process) in the mobile device, then the power supply 400 of FIG. 4 could be integrated on the CPU chip as IO (Input Output) voltage in this CPU manufacturing process is typically 1.8V and thus 1.8V rated devices are available in this process whereas 5.5V devices are not.

Power supply 400 of FIG. 4 is just one embodiment of the present invention. Several possible changes could be made, for example to the switch capacitor array 401, which are within the scope of the present invention. As an example, FIG. 9A, generally at 900A, shows a slightly modified version of the switched capacitor array 901A compared to switched capacitor array 401 of FIG. 4 wherein the switch 512B 912A is added between the node VMID2 910A and ground. Referring to the table in FIG. 8 which shows the state of the switches in the switched capacitor array 401 of FIG. 4 for various combinations in the control signal Phi1, Phi2, and Phi3 overlap intervals, it can be seen that the switches S1B and S2B are closed together when none of the control signals Phi1, Phi2, and Phi3 are high and also when only Phi3 is high. Since these conditions occur often when the duty cycle is less than $\frac{1}{3}$ (i.e. output voltage VOUT is less than $\frac{1}{3}$ times input voltage) and since a single switch could be made less resistive in a smaller area than that of two switches S1B and S2B in series, the power supply could be made even more efficient my adding the switch 512B 912A in FIG. 9A which closes whenever S1B and S2B are supposed to close together. The operation of the power supply 900A will be similar to that of the power supply 400 described above. The state of the switched capacitor array 901A under different combinations of control signals Phi1, Phi2, and Phi3 is listed in the Table 921A in FIG. 9A. Similarly, additional switches could be added to the switch capacitor array 901A. As a further example a switch from SW node 916A to ground could be added which is closed during the condition when S1B, S2B, and S3B are all supposed to be closed i.e. during the time when Phi1, Phi2, and Phi3 are all low.

Figure 9A:
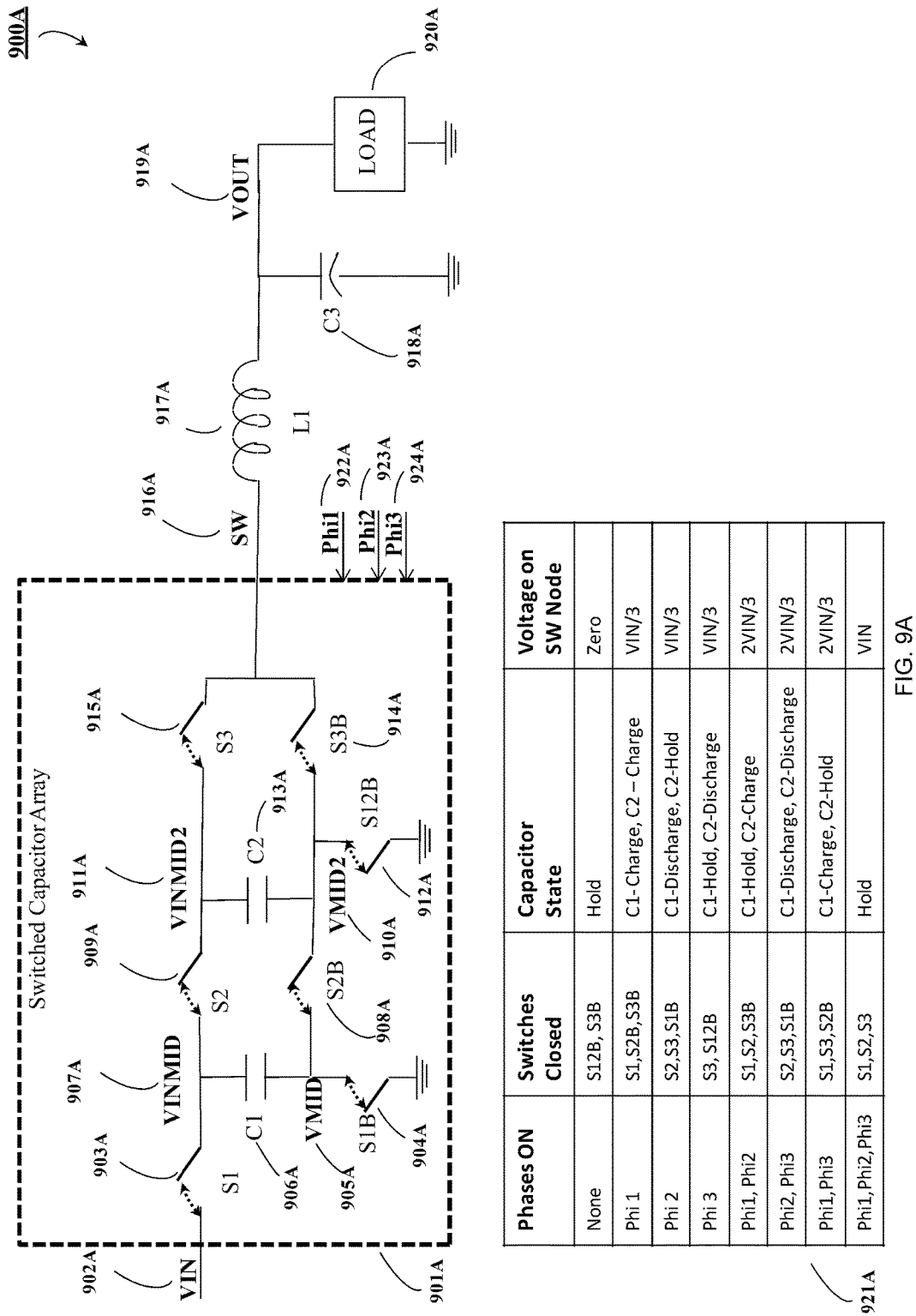
FIG. 9A illustrates one embodiment of the present invention.

As shown in FIG. 9A, VIN 902A goes into switched capacitor array 901A. Switched capacitor array 901A also receives as input control signals Phi1 922A, Phi2 923A, and Phi3 924A. Switched capacitor array 901A output SW node 916A is connected to inductor L1 917A which is connected to capacitor C3 918A and VOUT 919A to LOAD 920A. The switched capacitor array 901A consists of semiconductor switch devices (for example, transistors) S1 903A, S2 909A, S3 915A, which are in series between the input VIN 902A and the switched capacitor array 901A output SW node 916A, and switches S1B 904A, S2B 908A, S3B 914A, and 512B 912A are between SW node 916A and ground. The state of the switches, whether they are open (OFF) or closed (ON), is controlled by the signals Phi1 922A, Phi2 923A, and Phi3 924A and is illustrated at 921A. The switched capacitor array 901A also has two capacitors C1 906A (connected between the nodes VINMID 907A and VMID 905A) and C2 913A (connected between the nodes VINMID2 911A and VMID2 910A).

Figure 9B:
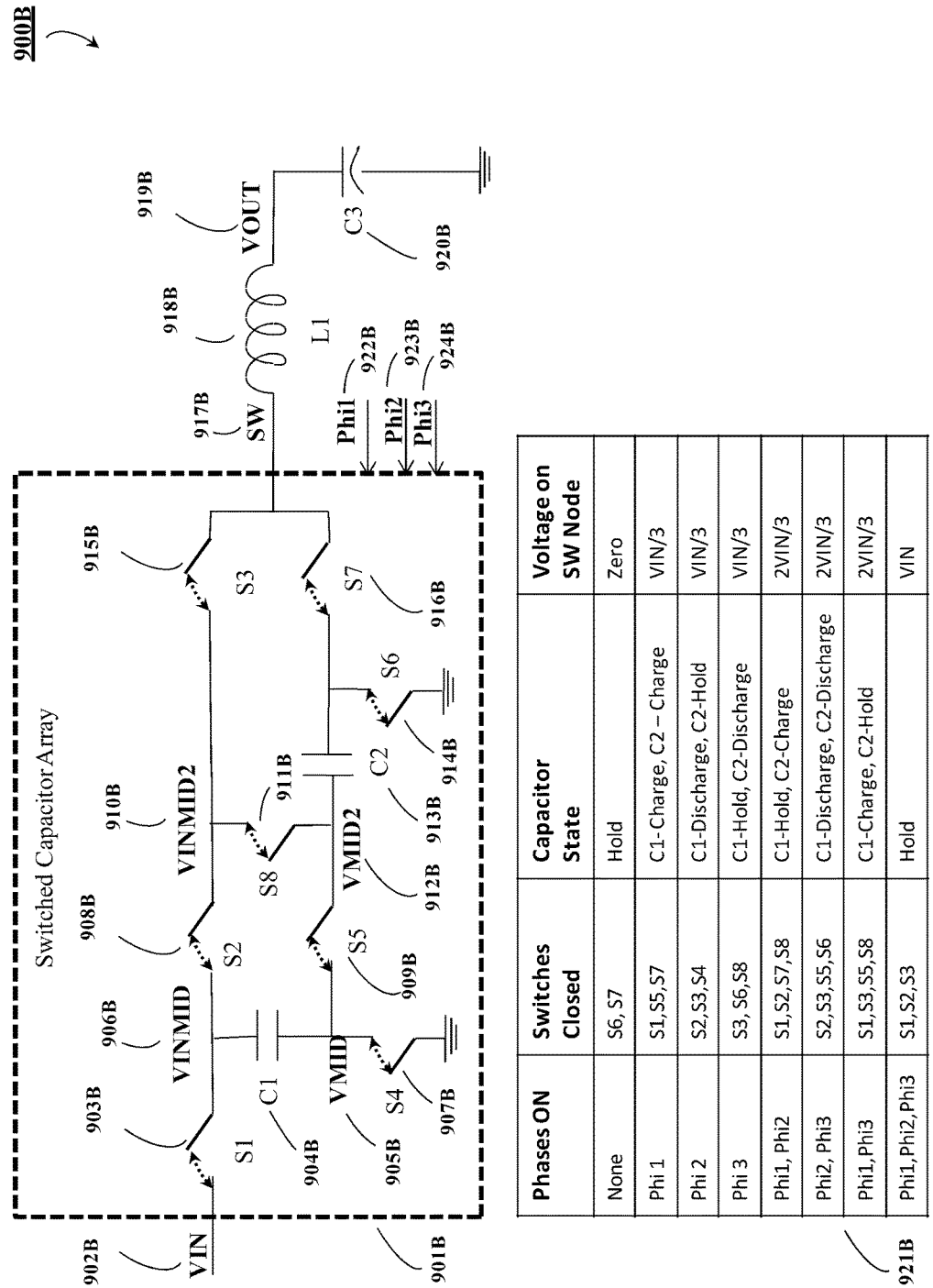
FIG. 9B illustrates one embodiment of the present invention.

FIG. 9B illustrates, generally at 900B, another embodiment of a power supply according to the present invention. The switched capacitor array 901B of FIG. 9B has a different configuration of switches and capacitors compared to 401 of the power supply 400 of FIG. 4. While the switched capacitor array 401 of FIG. 4 presents three sets of symmetrical phases at SW node when capacitor C1 is charged to ⅔ times input voltage VIN and C2 is charged to ⅓ times input voltage VIN, the switched capacitor array 901B can present three symmetrical phases at SW node 917B in each clock cycle when both the capacitors C1 904B and C2 913B are charged to ⅓ times input voltage VIN 902B. Similar to the power supply 400, the capacitors C1 904B and C2 913B in the power supply 900B are charged and discharged through the inductor L1 918B current and, as can be seen from the Table 921B, within any of the three symmetrical time intervals that could happen during one clock cycle generating same voltage at SW 917B node, there is no net change in capacitor charge (For example, VIN/3 at SW node can be generated symmetrically three times within a clock cycle with each of the three signals Phi1, Phi2, and Phi3 going high once in a clock cycle and from Table 921B with both C1 and C2 each being charged only during one of these three intervals generating VIN/3 [C1 and C2 charged when only Phi1 is high] and discharged during only one other interval generating VIN/3 [C1 discharged when only Phi2 is high and C2 discharged when only Phi3 is high] and these intervals being symmetrical, there is not net change in charge of C1 and C2 in one clock cycle).

Even though the switched capacitor array 901B of FIG. 9B is different than 401 of FIG. 4, the operation of the power supply is similar. For example, the control loop shown in FIG. 5 could be used to generate the signals Phi1 922B, Phi2 923B, and Phi3 924B (which are time shifted again by ⅓ times one clock period from each other) which control the state of the switches S1-S8 in the switched capacitor array 901B of FIG. 9B. As described above with reference to the operation of the power supply 400 of FIG. 4, the high and low times (thus the overlap and non-overlap times) of the control signals Phi1 922B, Phi2 923B, and Phi3 924B depend on the ratio of the required output voltage VOUT 919B to that of the input voltage VIN 902B. Table 921B summarizes the state of the switches as a function of the signals Phi 922B, Phi2 923B, and Phi3 924B. Similar to the power supply 400 of FIG. 4, there are three different combinations of the switches which generate VIN/3 at SW node 917B and there are three different configuration of the switches which generate a voltage equal to ⅔*VIN at SW node 917B (when C1 904B and C2 913B are both charged to VIN/3 in the power supply 900B). Thus, similar to the power supply 400 of FIG. 4, when VOUT 919B is less than VIN/3, the switched capacitor array 901B charges inductor L1 918B three times in a clock cycle with a voltage equal to VIN/3 (each time this voltage being generated with a different configuration of switches) and discharges inductor L1 918B to ground three times. Similarly when VOUT 919B is greater than ⅓*VIN but less than ⅔*VIN, the inductor L1 918B is charged in each clock cycle three times (each with different switch configuration) with a voltage equal to ⅔*VIN and discharged with a voltage equal to ⅓*VIN. In the case when VOUT 919B is higher than ⅔*VIN, the inductor L1 918B is charged with a voltage equal to VIN 902B but discharged with a voltage equal to ⅔*VIN. Thus similar to the power supply 400 of FIG. 4, the power supply 900B of FIG. 9B has an inductor L1 918B charging and discharging a voltage differential which is VIN/3 and since this happens three times in a clock cycle because of the time shifted Phi1, Phi2, and Phi3 signals, the inductor current ripple and output voltage ripple are much smaller than that of a standard buck converter and similar in magnitude to that of the power supply 400 of FIG. 4.

As shown in FIG. 9B VOUT 919B is connected to capacitor C3 920B. Switched capacitor array 901B includes switches S1 903B, S2 908B, S3 915B, S4 907B, S5 909B, S6 914B, S7 916B, and S8 911B. Node VINMID 906B is connected to capacitor C1 904B as shown. Node VMID 905B is connected to capacitor C1 904B as shown. Node VINMID2 910B is connected to switches S2 908B, S3 915B, and S8 911B as shown. Node VMID2 912B is connected to capacitor C2 913B as shown.

Figure 10:
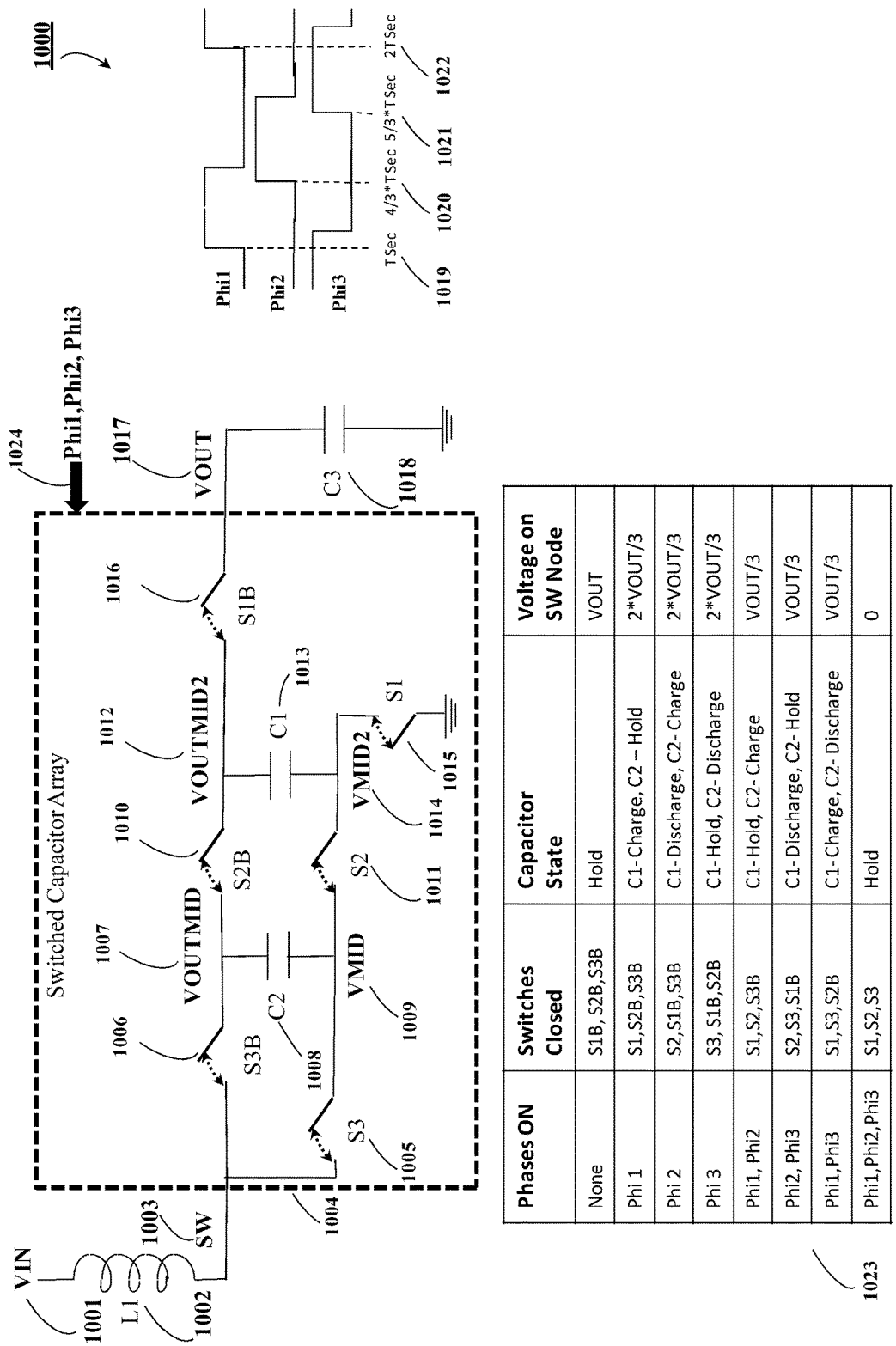
FIG. 10 illustrates one embodiment of the present invention.

Although the description of the present invention has been illustrated with examples of a step down buck converter, the invention is not so limited, and the techniques disclosed can be equally applied to other switch mode power supply topologies. For example, FIG. 10 illustrates the power supply 1000, a boost converter, according to one embodiment of the present invention. It consists of a switched capacitor array 1004 consisting of three switches S1 1015, S2 1011, and S3 1005 in series connected between one terminal SW node 1003 and ground (similar to the switches S1B 404, S2B 408, and S3B 414 in FIG. 4 connected in series between SW node 416 and ground) and three switches S1B 1016, S2B 1010, and S3B 1006 connected between the terminal SW node 1003 and the second terminal VOUT 1017 which is the output voltage of the boost converter (similar to the switches S1 403, S2 409, and S3 415 connected in series between the terminal SW node 416 and the other terminal VIN 402 of power supply 400 in FIG. 4). In addition, the magnetic element (inductor L1 1002) is connected between the terminal SW 1003 of the switched capacitor array 1004 and the input voltage VIN 1001 (as opposed to the inductor L1 417 in FIG. 4 which is connected between SW node 416 of the switched capacitor array 401 and the output voltage VOUT 419). The second terminal VOUT 1017 of the switched capacitor array 1004 is connected to the output voltage VOUT 1017 in the boost converter of FIG. 10 whereas the second terminal of the switched capacitor array 401 of FIG. 4 of the buck converter is connected to the input voltage VIN 402. Similarly, the switched capacitor array 1004 has two capacitors C1 1013 and C2 1008 however in this case capacitor C1 1013 is charged to ⅔ times the voltage at the output VOUT 1017 and C2 1008 is charged to ⅓ times VOUT 1017 as compared to ⅔*VIN for C1 406 and ⅓*VIN for C2 413 for the power supply of the buck converter in FIG. 4

The switched capacitor array 1004 is driven by the control signals Phi1, Phi2, and Phi3 all shown at 1024. As described above for the buck converter, as an example the control loop 500 of FIG. 5, could be used to generate the control signals Phi1, Phi2 and Phi3. While Phi1 could be used to regulate the output voltage VOUT 1017 of the boost converter (and thus represents duty cycle), Phi2 in addition is used to regulate voltage on the capacitor C1 1013 as the output 511 (which is proportional to the difference in the reference voltage 503 and capacitor voltage 504 in FIG. 5) controls the generation of the signal Phi2. However, the positive input 503 of the proportional gain block 508 in this example would be equal to ⅔*VOUT as the capacitor C1, as described above, needs to regulate to ⅔ times the output voltage. Similarly Phi3 could be used to regulate the voltage on the second capacitor C2 1008 to ⅓*VOUT. As described with respect to the power supply of FIG. 4, in steady state when the voltages of the capacitors C1 and C2 are in regulation, the high and low time durations of the Phi2 and Phi3 signals match that of Phi1 and thus again represent a duty cycle of the converter. In addition, similar to the power supply 400 of FIG. 4, the signals Phi1, Phi2, and Phi3 are time shifted from each other by ⅓ time clock period as shown by 1019, 1020,1021 and 1022 in FIG. 10.

The operation of the switched capacitor array 1004 of the boost converter of FIG. 10 is similar to that of the power supply 400 of FIG. 4 and it presents a voltage at SW node 1003 which is a fraction of the voltage at the output node VOUT 1017 (as compared to a fraction of the input voltage in the buck converter). Table 1023 in FIG. 10 summarizes the switch configurations for different cases of the control signals Phi, Phi2 and Phi3. Firstly, in the case where VOUT 1017 is less than 3/2 times input voltage VIN 1001, as the duty cycle of the boost converter in steady state continuous conduction mode is given by (1−VIN/VOUT), is less than ⅓. Since Phi1, Phi2, and Phi3 represent duty cycle and are time shifted signals by ⅓*T, where T is the clock period, in this case where the duty cycle is less than ⅓, only one signal is high at any given time and in one clock cycle Phi1 goes high, followed by all three signal low, followed by Phi2 going high followed by all three low, followed by Phi3 going high, followed by all going low again (similar to the Phi1, Ph2, and Phi3 behavior in FIGS. 6A through 6F). When all three signal are low, switches S1 1015, S2 1011, and S3 1005 are open and their complimentary switches S1B 1016, S2B 1010, and S3B 1006 are closed, thus connecting output VOUT 1017 to SW node 1003 and the inductor L1 1002 discharges through a voltage differential equal to (VOUT−VIN). Similarly, when only one of the signals Phi1, Phi2, and Phi3 is high as shown in Table 1023 in FIG. 10, the voltage at SW node is ⅔*VOUT, since in this case VOUT 1017 is less than 3/2*VIN, ⅔*VOUT is less than VIN 1001 and hence inductor L1 1002 is charging from the input VIN 1001 with a voltage differential equal to (VIN−⅔*VOUT). Thus, the switched capacitor array 1004 presents a voltage at SW node 1003 equal to ⅔*VOUT which charges the inductor L1 1002 and a voltage equal to VOUT 1017 which discharges the inductor L1 1002. The differential between the voltages at SW node 1003 thus being equal to (VOUT−⅔*VOUT) i.e. ⅓*VOUT and in addition the inductor L1 1002 is charged and discharged three times in a clock cycle due to the phase shifted operation of the control signals Phi1, Phi2, and Phi3.

Similarly, when VOUT 1017 is greater than 3/2*VIN but less than 3*VIN, the duty cycle of the boost converter, being equal to (1−VIN/VOUT), is greater than ⅓ but less than ⅔. Since Phi1, Phi2, and Phi3 are time shifted by ⅓ time of the clock period and the duty cycle is higher than ⅓, there is no time interval in the clock period during which all the signals Phi1, Phi2, and Phi3 are low together and also since the duty cycle is less than ⅔ times clock period, only at most two of the three signals (Phi1, Phi2, and Phi3) can be high at any time in this case. Again from Table 1023 in FIG. 10, when only one phase is high, the voltage at the SW node 1003 is ⅔*VOUT and since VOUT 1017 is greater than 3/2*VIN, ⅔*VOUT is higher than VIN 1001, thus inductor L1 1002 current is discharging with a slope equal to the voltage differential across it i.e. equal to (⅔*VOUT−VIN) and when two of the three phases are high, the voltage at SW node 1003 is ⅓*VOUT. Since, VOUT 1017 is less than 3*VIN, ⅓*VOUT is less than VIN 1001 and inductor L1 1002 is charging with a voltage differential equal to (VIN−⅓*VOUT). Thus again in this case where 3/2*VIN<VOUT<3*VIN, the switched capacitor array 1004 presents a voltage at SW node 1003 which is equal to ⅓*VOUT during the times when two of the three phases overlap and a voltage equal to ⅔*VOUT during the times when only one phase is high, the difference between these voltages equal to (⅔*VOUT−⅓*VOUT) i.e. ⅓*VOUT, similar to the case above when VOUT was less than 3/2*VIN.

Similarly when VOUT 1017 is higher than 3*VIN, the duty cycle of the boost converter given by (1−VIN/VOUT) is greater than ⅔. In this case, the signals Phi1, Phi2, and Phi3 can all be high at some time intervals within a clock period and only two of the three signals will be high during the rest of the time. When all the signals (Phi1, Phi2, and Phi3) are high together, SW node 1003 in FIG. 10 is pulled to ground through the closed switches S1 1015, S2 1011, and S3 1005, thus the voltage at SW node 1003 being equal to zero and inductor L1 1002 is charging with a voltage differential equal to VIN 1001. When only two of the three phases (signals Phi1, Phi2, and Phi3) are high, the SW node 1003 is pulled to ⅓*VOUT. Since VOUT 1017 is higher than 3*VIN in this case, the inductor L1 1002 is discharging during this time with a voltage across it being equal to (⅓*VOUT−VIN). Thus again in this case where VOUT>3*VIN, the switched capacitor array 1004 presents a voltage at SW node 1003 which is equal to ⅓*VOUT during the times when two of the three phases overlap (signals Phi1, Phi2, and Phi3) and a voltage equal to zero during the times all the three phases (signals Phi1, Phi2, and Phi3) are high, the difference between these voltages equal to ⅓*VOUT Thus irrespective of the input to output voltage ratio, the power supply 1000 of FIG. 10 presents a charging and discharging voltage at SW node 1003 which is ⅓*VOUT. Comparing this to that of a standard boost converter, for example in FIG. 1B, the SW node 120 is pulled down to zero when switch 112 is turned ON and is pulled up to VOUT 117 when the switch 114 is turned ON, thus the voltage swing at SW node 120 of a standard boost converter being equal to output voltage VOUT 117.

Thus, one embodiment of the boost converter 1000 of FIG. 10 of the present invention has a voltage swing at the SW node 1003 which is one-third that of a standard boost converter, thus greatly reducing switching losses. In addition, due to the reduced voltage across them, the switches S1 1015, S2 1011, S3 1005, S1B 1016, S2B 1010, and S3B 1006 can be rated to a voltage equal to ⅓ that of the output voltage, whereas in a standard boost converter, the switches need to be rated for full output voltage.

As shown in FIG. 10 VOUT 1017 is connected to capacitor C3 1018. In switched capacitor array 1004 node VOUTMID 1007 is connected to capacitor C2 1008 as shown. In switched capacitor array 1004 node VMID 1009 is connected to capacitor C2 1008 as shown. In switched capacitor array 1004 node VOUTMID2 1012 is connected to capacitor C1 1013 as shown. In switched capacitor array 1004 node VMID2 1014 is connected to capacitor C1 1013 as shown.

The above method according to one embodiment of the invention can be generalized to N voltage levels at the inductor. The method involves generating a discharging voltage at inductor equal to X/N*VOUT and charging voltage at inductor equal to (X−1)/N*VOUT when VIN is less than X/N*VOUT but higher than (X−1)/N*VOUT, wherein X and N are any whole numbers with X being less than equal to N. In addition, if N control signals are used to generate these charge and discharge voltages, with each control signal representing duty cycle of the converter but shifted in time from the previous signal by 1/N times one clock period, then inductor charge and discharge voltages could be automatically generated by the number of signals overlapping at any given time i.e. presenting the inductor with a voltage equal to (N−K)/N*VOUT at any time when K of the N signals are high. Since all the N control signals are representing duty cycle but shifted in time by 1/N*clock period, the overlap times are automatically adjusted by the loop, irrespective of the required voltage at the output, such that the required charge and discharge voltages for the inductor are correctly presented. Thus applying the equation (N−K)/N*VOUT to the power supply 1000 with three control signals Phi1, Phi2, and Phi3, i.e. N=3, when K=0, (i.e. when Phi1, Phi2, and Phi3 are all low), the voltage at the inductor L1 1002 (at SW node 1003) is VOUT, and when K=1 (i.e. when only one signal (Phi1, Phi2, Phi3) is high), the voltage at the inductor L1 1002 is ⅔*VOUT. Similarly it could be applied for other cases, each generating a voltage which matches the voltages described above with reference to the power supply of 1000 and as shown in the Table 1023 in FIG. 10.

Similar to the buck power supply 400 of FIG. 4, the boost power supply 1000 of FIG. 10, due to the reduced voltage swing at the SW node and with an effective switching frequency which is three times that of a standard boost converter (due to the time shifted phases Phi1, Phi2, and Phi3), produces a much smaller Inductor and output voltage ripple. Thus for a required inductor current and output voltage ripple, the Inductor L1 1002 and output capacitor C3 1018 values and hence size of the power supply of FIG. 10 could be made much smaller compared to that of a standard boost converter.

Figure 11:
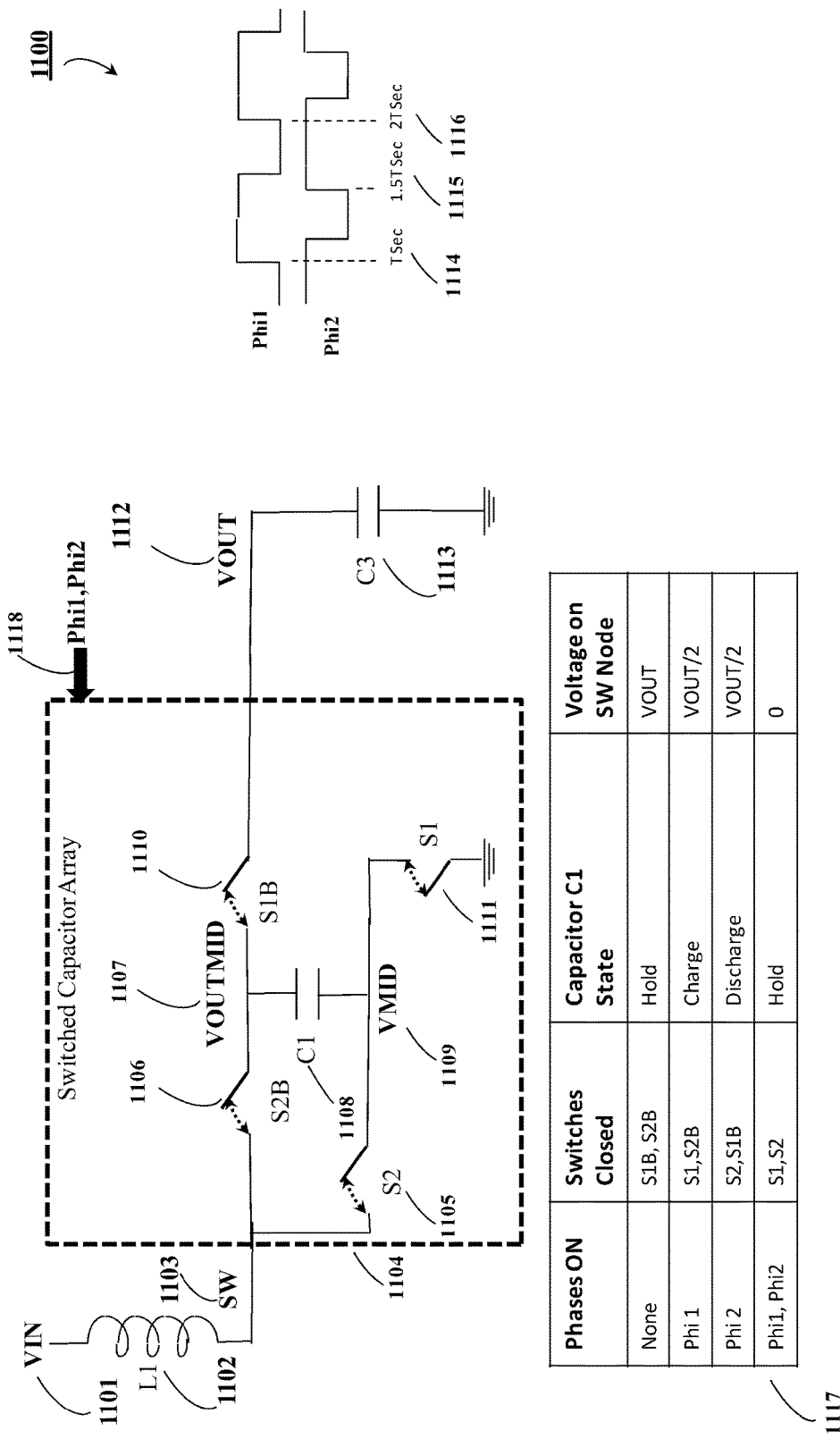
FIG. 11 illustrates one embodiment of the present invention.

The power supply 1100 in FIG. 11 is another embodiment of the boost converter according to the present invention. The switched capacitor array 1104 of FIG. 11 consists of only one capacitor C1 1108 and four switches S1 1111, S2 1105, S1B 1110, and S2B 1106 controlled by two phases Phi1 and Phi2 as shown at 1118 (as compared to two capacitors C1 and C2 and six switches S1-S3 and S1B-S3B controlled by three phases in the power supply of FIG. 10).

Since there are only two phases in the embodiment shown in FIG. 11 they are time shifted by ½ of the clock period rather than ⅓ of the clock period so that both the phases are symmetrical as shown in 1114, 1115, and 1116 in FIG. 11. In addition, capacitor C1 1108 is regulated to a voltage equal to ½ of the output voltage VOUT 1112. As apparent to one skilled in the related art, the duty cycle of a boost converter in steady state continuous conduction mode is given by (1−VIN/VOUT) where VIN is the input voltage. Thus when VOUT is less than 2*VIN, the duty cycle, and hence the time interval where Phi1 and Phi2 are high, is less than ½ of the clock cycle. Since Phi1 and Phi2 are time shifted by ½ clock cycle, there is no overlap of time during which both of them are high. Thus in this case, either Phi 1 or Phi 2 is high or both of them are low during any given time in steady state operation. Table 1117 in FIG. 11 summarizes the state of the switches (and their complementary switch which is open) in switched capacitor array 1104 for all possible scenarios.

When the duty cycle is less than 0.5 (i.e. 50%), the switched capacitor array generates two phases in a clock cycle, one phase consisting of Phi1 high (during this time, voltage at SW node 1103 being equal to VOUT/2 and since VOUT 1112 is less than 2*VIN, inductor L1 1102 is charging with a voltage differential [VIN−VOUT/2] and capacitor C1 1108 is charging with the inductor current) followed by both Phi1 and Phi2 low (during this time, voltage at SW node 1103 being equal to VOUT 1112 and thus discharging the inductor L1 1102 with a voltage differential [VOUT−VIN]). The second phase consisting Phi2 being high (during this time, again voltage at SW node 1103 being equal to VOUT/2 and inductor L1 1102 is charging with voltage differential [VIN−VOUT/2] but capacitor C1 1108 is discharging with the inductor current) followed by both Phi1 and Phi2 being low. Thus, one clock cycle consists of two symmetrical phases; within each phase SW node 1103 is presented with voltages equal to VOUT 1112 and VOUT/2. Thus, the SW node 1103 swing is (VOUT−VOUT/2) which is half that of a standard boost converter and in addition, the effective frequency is twice that of a standard boost converter.

Since capacitor C1 1108 is charging with inductor current during the time when Phi1 is high and since it's discharging with inductor current during the time when Phi2 is high, because of symmetry in both the phases in steady state, the capacitor C1 1108 charge and discharge time duration are equal. In addition since the charge and discharge currents of the capacitor C1 1108 are the same (both being equal to average inductor L1 1102 current which is constant in steady state operation), the net change in capacitor C1 1108 charge is zero in one clock cycle. Thus the capacitor voltage can be regulated at a constant voltage in steady state as there is no net change in its voltage in each clock cycle.

Because of the reduced voltage swing at SW node 1103 which is one half that of a standard boost converter and the effective frequency which is twice, the power supply 1100 of FIG. 11 similarly could use a smaller inductor L1 1102 and output capacitor C3 1113 in addition to the reduced voltage rating for the switches S1 1111, S2 1105, S1B 1110, and S2B 1106 which is one half the voltage rating of that of a standard boost converter.

In FIG. 11 as shown VIN 1101 is connected to inductor L1 1102. In switched capacitor array 1104 node VOUTMID 1107 is connected to capacitor C1 1108 as shown. In switched capacitor array 1104 node VMID 1109 is connected to capacitor C1 1108 as shown.

Figure 12:
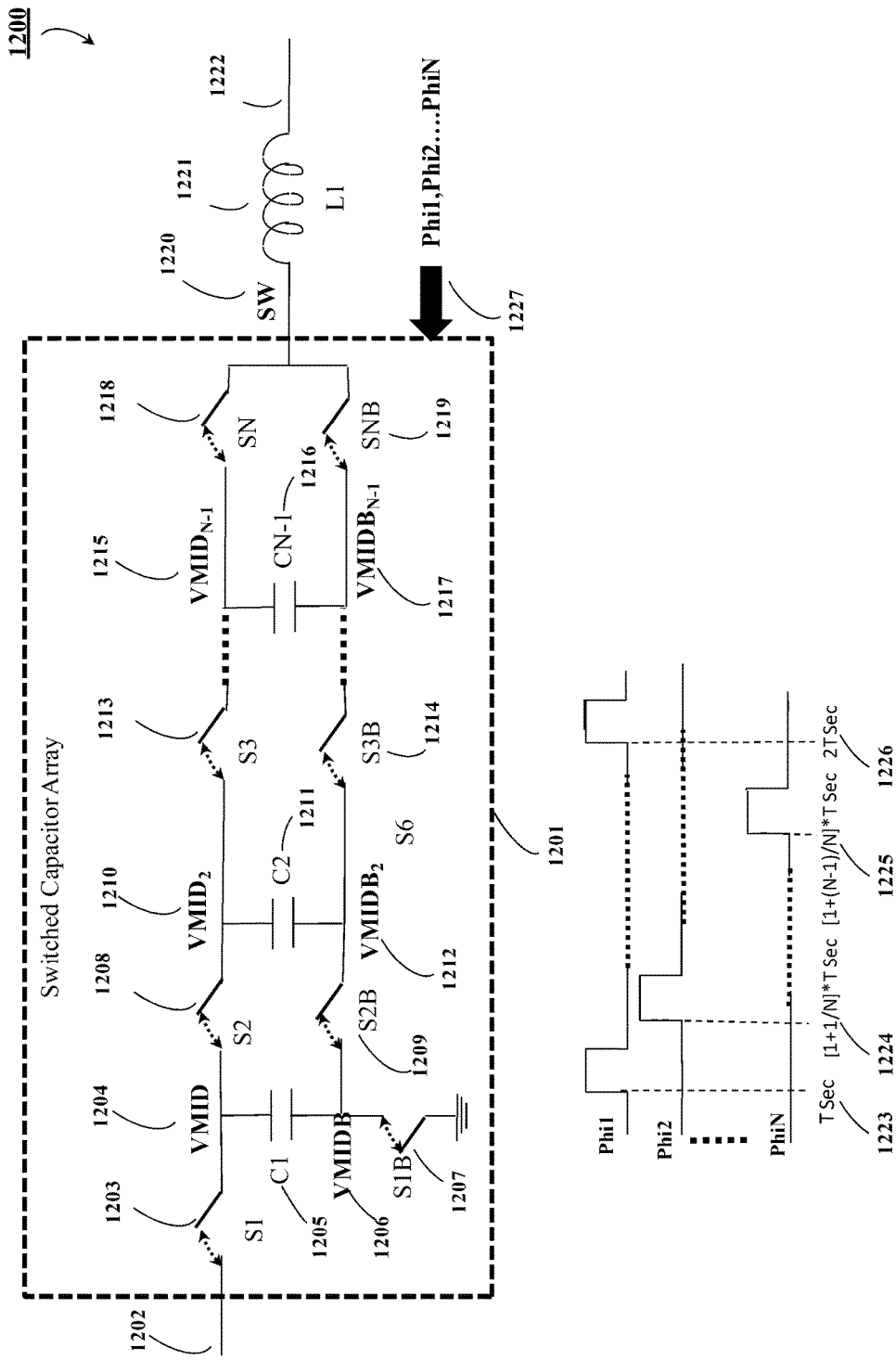
FIG. 12 illustrates one embodiment of the present invention.

While power supplies 400 of FIG. 4, 900A of FIG. 9A, 900B of FIG. 9B, 1000 of FIGS. 10, and 1100 of FIG. 11 are some embodiments of the present invention, the switched capacitor array 1201 of FIG. 12 illustrates another embodiment according the present invention, generally at 1200. This switched capacitor array consists of N (an integer) Switches S1, S2, . . . , SN in series connected between two terminals 1202 and SW 1220 and N Switches S1B, S2B, . . . , SNB connected in series between the terminals SW 1220 and a negative reference potential (ground in this example) and (N-1) capacitors C1, C2, . . . , CN−1 connected between the switches. Switches are the complement of each other as previously described, i.e. when SN is closed SNB is open and vice versa. These switches in the switched capacitor array are controlled by N control signals 1227 respectively consisting of Phi1, Phi2, . . . , PhiN wherein these control signals are shifted in time by 1/N times the one clock period from each other as shown in 1223, 1224, 1225, 1226. Further one terminal SW 1220 of the switched capacitor array is coupled to one terminal of the magnetic storage element (inductor L1 1221 in the FIG. 12).

This switched capacitor array together with the magnetic element could be incorporated into any switch mode power supply topology wherein the voltage swing at SW 1220 is 1/N times the voltage swing of a standard power supply and in addition the voltage at the SW 1220 consists of N symmetrical phases within one switching clock cycle.

The number of switches, capacitors and phases in the switched capacitor array 1201 is set by the number N wherein it is desirable to choose N based on, among other factors, input to output voltage ratio, voltage rating of the devices available in the manufacturing foundry technology, required reduction in the magnetic element volume, required output voltage ripple etc.

The voltage stored in the capacitors C1 1205, C2 1211, . . . , CN−1 1216 and where the terminals 1202 and 1222 are coupled to depends on the power supply topology. As an example, if the power supply is a step down buck converter, then the terminal 1202 is coupled to the input power supply VIN and the terminal 1222 of the inductor is coupled to the output voltage VOUT and voltage on capacitors are regulated to (N−1)/N times input voltage on C1 1205, (N−2)/N times input voltage on C2 1211 and so on with CN−1 1216 being charged to 1/N times the input voltage VIN. This generates a voltage swing at SW 1220 which is 1/N times the input voltage VIN symmetrically N times in a clock cycle. As an example, if N is equal to 3, then this power supply becomes the power supply 400 of FIG. 4 with three phases Phi1, Phi2, and Phi3 controlling three switches S1, S2, and S3 and their complimentary switches S1B, S2B, and S3B with C1 being charged to (3−1)/2 times input voltage i.e. ⅔*VIN and C2 being charged to ⅓*VIN.

Similarly, if the switched capacitor array 1201 together with inductor L1 1221 of FIG. 12 is used in a step up boost converter, then node 1202 is coupled to the output voltage VOUT and the inductor node 1222 is coupled to the input voltage VIN, with C1 1205 being charged to (N−1)/N times the output voltage VOUT, C2 1211 being charged to (N−2)/N times the output voltage and so on with C1 1205 being charged to 1/N times the output voltage. If N is equal to 3 for a boost converter, then the switched capacitor array 1201 of FIG. 12 becomes identical to the switched capacitor array 1004 of FIG. 10, and similarly if N is 2, then it becomes the switched capacitor array 1104 in FIG. 11.

As shown in FIG. 12 at switched capacitor array 1201 are switches S1 1203, S1B 1207, S2 1208, S2B 1209, S3 1213, S3B 1214, SN 1218, and SNB 1219. As shown in FIG. 12 at switched capacitor array 1201 are nodes VMID 1204, VMIDB 1206, $VMID_2$ 1210, $VMIDB_2$ 1212, $VMID_{N-1}$ 1215, and $VMIDB_{N-1}$ 1217.

While FIG. 12 illustrates one embodiment of the present invention, several modifications to the switched capacitor array 1201 can be made. As discussed with reference to switched capacitor array 901A in FIG. 9A where an additional switch 512B is added from node VMID2 to ground, similarly additional switches could be added from any or all of the nodes $VMIDB_2$, . . . , $VMIDB_{N-1}$, SW to ground in the switched capacitor array 1201 of FIG. 12.

Similarly as illustrated with power supply 900B in FIG. 9B wherein both the capacitors C1 and C2 store the same voltage equal to VIN/3 and with a switch configuration which is different to that of the switched capacitor array 1201 in FIG. 12, a different switch configuration consisting of (N−1) capacitors with switches controlled by N signals with each signal time shifted from the previous signal by 1/N times the clock period could be used as long as this switch array generates N symmetrical phases in voltage at the node coupled to the magnetic element within one clock cycle wherein each capacitor of the array is charged and discharged with a current equal to that flowing through the magnetic element and in steady state there is no net charge accumulation in any of capacitors in the switched capacitor array.

While not germane to the operation or techniques disclosed, one of skill in the art will appreciate that the device types of devices, for example, switches as shown at S1, S2, S3, S1B, S2B, S3B, etc. in FIG. 4, FIG. 9A, FIG. 9B, FIG. 10, FIG. 11, FIG. 12, and in any figure showing switches, may be operated using different polarities and may be fabricated in different technology types, for example, but not limited to, CMOS (complementary metal oxide semiconductor (MOS)) devices, Bipolar devices, DMOS (double diffused MOS) devices, NMOS (n-type MOS), PMOS (p-type MOS) devices, etc. Additionally the power systems of the present invention can be implemented in CMOS, BiCMOS (bipolar CMOS), BCD (BiCMOS and Bipolar, CMOS and DMOS), GaAs (gallium arsenide), GaN (Gallium nitride) SOI (silicon on insulator), or other processes. In addition these devices for the clarity of explanation of the invention are shown to be step down buck type and step up boost type and synchronous (switches for both high side and low side devices) switchers. Without limitation, the present invention could be applied to additional switcher types, for example non-synchronous switchers (wherein some of the switches could be replaced by diodes, Schottky diodes etc.), buck-boost switchers (wherein the switched capacitor array could be used on one or both sides of the inductor), half bridge (as an example, the switched capacitor array is coupled to the primary side of the transformer and the secondary side is coupled to the output with additional components like rectification diodes, etc.), full bridge, inverting power supply, etc. In addition, the magnetic component could be inductors; transformers, etc. and the input power source could also be AC rather than a DC source.

In addition, the control loop shown in FIG. 5 is illustrated for the clarity of explanation with a pulse width modulation scheme to generate duty cycle and in addition capacitor voltage regulation signals controlling only Phi2 and Phi3. The principals disclosed could equally be applied to other control schemes like hysteretic, constant on time etc. Further, the operation of the power supplies have been illustrated with a specific sequence in control signals, for example Phi1 is followed by Phi2 and is followed by Phi3 in FIG. 6A. Any other sequence in the control signals could equally be implied for the power supplies of the present invention.

Thus a method and apparatus for switched mode power supplies have been described.

FIG. 13 shows in Table 1 a Figure of Performance where higher is better for various factors and configurations. Table 1 is a performance summary for step down power supplies.

FIG. 14 shows in Table 2 a Figure of Performance where higher is better for various factors and configurations. Table 2 is a performance summary for step up power supplies.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

It is to be understood that in any one or more embodiments of the invention where alternative approaches or techniques are discussed that any and all such combinations as may be possible are hereby disclosed. For example, if there are five techniques discussed that are all possible, then denoting each technique as follows: A, B, C, D, E, each technique may be either present or not present with every other technique, thus yielding 2^5 or 32 combinations, in binary order ranging from not A and not B and not C and not D and not E to A and B and C and D and E. Applicant(s) hereby claims all such possible combinations. Applicant(s) hereby submit that the foregoing combinations comply with applicable EP (European Patent) standards. No preference is given any combination.

Thus while particular embodiments and applications of the present invention have been illustrated and described, it is to be understood that the invention is not limited to the precise construction and components disclosed herein. Various modifications, changes and variations which will be apparent may be made in the arrangement, operation and details of the method and apparatus of the present invention disclosed herein without departing from the spirit and scope of the invention as defined in the claims.

What is claimed is:

1. A power supply comprising:
    a switched capacitor array consisting of switches and capacitors, wherein each of said switches has an ON state and an OFF state;
    a first terminal of said switched capacitor array coupled to a first terminal of a magnetic storage element;
    a second terminal of said switched capacitor array coupled to a first voltage;
    a third terminal of said switched capacitor array coupled to a second voltage;
    wherein said switched capacitor array consists of a first set of N switches connected in series between said first terminal of said switched capacitor array and said second terminal of said switched capacitor array and a second set of N switches connected in series between said first terminal of said switched capacitor array and said third terminal of said switched capacitor array;
    wherein said switching capacitor array consists of N−1 capacitors;
    wherein N is greater or equal to 3;
    wherein when there is a current flow in any of said capacitors in said switched capacitor array, said current flow is similar in magnitude to a current flow in said magnetic storage element;
    wherein said switched capacitor array provides N similar phases in a switching clock cycle at said first terminal of said switched capacitor array wherein each phase of said N similar phases consists of a charging voltage which causes said current flowing through said magnetic storage element to increase and a discharging voltage which causes said current flowing through said magnetic storage element to decrease;
    wherein said charging voltage is similar in magnitude in each of said N similar phases and said discharging voltage is similar in magnitude in each of said N similar phases; and
    wherein, when said charging voltage is not equal to said first voltage at said second terminal of said switched capacitor array and said discharging voltage is not equal to said second voltage at said third terminal of said switched capacitor array, a configuration of said switched capacitor array to generate said charging voltage is different in each of said N similar phases and a configuration of said switched capacitor array to generate said discharging voltage is different in each of said N similar phases.

2. The power supply of claim 1 wherein at least one of said charging voltage and said discharging voltage is a fraction of said first voltage on said second terminal of said switched capacitor array.

3. The power supply of claim 1 wherein said switched capacitor array is controlled by N signals, each of said N signals is shifted in time from a previous N signal by 1/N times a switching clock cycle period, and wherein said N signals control said ON state and said OFF state of said first set of N switches and said second set of N switches in said switched capacitor array and wherein said N signals also control regulation of an output voltage of said power supply and voltages on said N−1 capacitors.

4. A power supply comprising:
    a switched capacitor array consisting of switches and capacitors, wherein each of said switches has an ON state and an OFF state;
    a first terminal of said switched capacitor array coupled to a first terminal of a magnetic storage element;
    a second terminal of said switched capacitor array coupled to a first voltage;
    a third terminal of said switched capacitor array coupled to a second voltage;
    wherein said switched capacitor array consists of a first set of N switches connected in series between said first terminal of said switched capacitor array and said second terminal of said switched capacitor array and a second set of N switches connected in series between said first terminal of said switched capacitor array and said third terminal of said switched capacitor array;
    wherein said switching capacitor array consists of N−1 capacitors;
    wherein N is greater or equal to 3;
    wherein when there is a current flow in any of said capacitors in said switched capacitor array, said current flow is similar in magnitude to a current flow in said magnetic storage element;
    wherein said power supply is a step down converter;
    wherein said second terminal of said switched capacitor array is coupled to an input of said power supply;
    a second terminal of said magnetic element is coupled to an output of said power supply;
        wherein said switched capacitor array provides N similar phases in a switching clock cycle at said first terminal of said switched capacitor array coupled to said first terminal of said magnetic storage element wherein each of said N similar phases consists of a charging voltage which causes said current flowing through said magnetic storage element to increase and a discharging voltage which causes said current flowing through said magnetic storage element to decrease;
    wherein said charging voltage is similar in magnitude in each of said N similar phases and said discharging voltage is similar in magnitude in each of said N similar phases; and
    wherein, when said charging voltage is not equal to said first voltage at said second terminal of said switched capacitor array and said discharging voltage is not equal to said second voltage at said third terminal of said switched capacitor array, a configuration of said switched capacitor array to generate said charging voltage is different in each of said N similar phases and a configuration of said switched capacitor array to generate said discharging voltage is different in each of said N similar phases.

5. The power supply of claim 4 wherein at least one of said charging voltage and said discharging voltage is a fraction of said first voltage.

6. The power supply of claim 5 wherein said switched capacitor array is controlled by N signals, each of said N signals is shifted in time from a previous one of said N signals by 1/N times one switching clock cycle period; and
   wherein said N signals control said ON state and said OFF state of said first set of N switches and said second set of N switches in said switched capacitor array and wherein said N signals also control a regulation of an output voltage of said power supply and a voltage on each of said N−1 capacitors.

7. The power supply of claim 5 wherein N is equal to three and said switched capacitor array has two capacitors and a difference in voltage of said charging voltage on said magnetic storage element, which causes a current in said magnetic storage element to increase, and said discharging voltage on said magnetic storage element, which causes said current in said magnetic storage element to decrease, is proportional to ⅓ times said first voltage.

8. A power supply comprising:
   a switched capacitor array consisting of switches and capacitors, wherein each of said switches has an ON state and an OFF state;
   a first terminal of said switched capacitor array coupled to a first terminal of a magnetic storage element;
   a second terminal of said switched capacitor array coupled to a first voltage;
   a third terminal of said switched capacitor array coupled to a second voltage;
   wherein said switched capacitor array consists of N switches connected in series between said first terminal of said switched capacitor array and said second terminal of said switched capacitor array and a second set of N switches connected in series between said first terminal of said switched capacitor array and said third terminal of said switched capacitor array;
   wherein said switching capacitor array consists of N−1 capacitors;
   wherein N is greater or equal to 3;
   wherein when there is a current flow in any of said capacitors in said switched capacitor array, said current flow is similar in magnitude to a current flow in said magnetic storage element;
   wherein said power supply is a step up converter, wherein said second terminal of said switched capacitor array is coupled to an output of said step up converter, and wherein a second terminal of said magnetic element is coupled to an input of said power supply;
   wherein said switched capacitor array provides N similar phases in a switching clock cycle at said first terminal of said switched capacitor array coupled to said first terminal of said magnetic storage element wherein each phase of said N similar phases consists of a charging voltage which causes said current flowing through said magnetic storage element to increase and a discharging voltage which causes said current flowing through said magnetic storage element to decrease;
   wherein said charging voltage is similar in magnitude in each of said N similar phases and said discharging voltage is similar in magnitude in each of said N similar phases; and
   wherein, when said charging voltage is not equal to said first voltage at said second terminal of said switched capacitor array and said discharging voltage is not equal to said second voltage at said third terminal of said switched capacitor array, a configuration of said switched capacitor array to generate said charging voltage is different in each of said N similar phases and a configuration of said switched capacitor array to generate said discharging voltage is different in each of said N similar phases.

9. The step up converter of claim 8 wherein at least one of said charging voltage and discharging voltage is a fraction of said first voltage.

10. The power supply of claim 9 wherein said switched capacitor array is controlled by N number of signals, each of said N number of signals being shifted in time from a previous N signal by 1/N times one switching clock cycle period, and wherein said N signals control said ON state and said OFF state of said first set of N switches and said second set of N switches in said switched capacitor array and wherein said N signals also control regulation of said first voltage and voltages on said N−1 capacitors.

11. The power supply of claim 9 wherein N is equal to three and said switched capacitor array has two capacitors and a difference in voltage of said charging voltage on said magnetic storage element, which causes a current in said magnetic storage element to increase, and said discharging voltage on said magnetic storage element, which causes said current in said magnetic storage element to decrease, is proportional to ⅓ times said first voltage.

* * * * *